US010244507B2

(12) United States Patent
Tarlazzi et al.

(10) Patent No.: US 10,244,507 B2
(45) Date of Patent: Mar. 26, 2019

(54) DISTRIBUTED PROCESSING IN A CENTRALIZED RADIO ACCESS NETWORK

(71) Applicant: Andrew Wireless Systems GmbH, Buchdorf (DE)

(72) Inventors: Luigi Tarlazzi, Bagnacavallo (IT); Samuele Brighenti, Faenza (IT)

(73) Assignee: Andrew Wireless Systems GmbH, Buchdorf (DE)

(*) Notice: Subject to any disclaimer, the term of this patent is extended or adjusted under 35 U.S.C. 154(b) by 76 days.

(21) Appl. No.: 15/024,548

(22) PCT Filed: Sep. 23, 2014

(86) PCT No.: PCT/IB2014/064785
§ 371 (c)(1),
(2) Date: Mar. 24, 2016

(87) PCT Pub. No.: WO2015/044871
PCT Pub. Date: Apr. 2, 2015

(65) Prior Publication Data
US 2016/0242147 A1    Aug. 18, 2016

Related U.S. Application Data

(60) Provisional application No. 61/881,598, filed on Sep. 24, 2013.

(51) Int. Cl.
*H04W 72/04* (2009.01)
*H04W 88/08* (2009.01)

(52) U.S. Cl.
CPC ......... *H04W 72/04* (2013.01); *H04W 72/042* (2013.01); *H04W 88/085* (2013.01); *H04W 88/08* (2013.01)

(58) Field of Classification Search
CPC ......... H04L 47/10; H04L 47/12; H04L 47/20; H04L 47/24; H04L 47/32; H04L 47/38;
(Continued)

(56) References Cited

U.S. PATENT DOCUMENTS 6,711,144 B1    3/2004 Kim et al.
6,731,618 B1    5/2004 Chung et al.
(Continued)

FOREIGN PATENT DOCUMENTS

EP    2574138    3/2013
EP    2658138    10/2013
WO    2012/083850    6/2012

OTHER PUBLICATIONS

International Search Authority, "International Search Report for PCT Application No. PCT/IB2014/064785", "from Foreign Counterpart to U.S. Appl. No. 15/024,548", dated Apr. 2, 2015, pp. 1-4, Published in: WO.

(Continued)

*Primary Examiner* — Dady Chery
(74) *Attorney, Agent, or Firm* — Fogg & Powers LLC

(57) ABSTRACT

Certain features relate to a centralized radio access network (C-RAN) that can flexibly and dynamically allocate protocol layer processing among baseband processing units and remote units. A C-RAN can be configured to include a media access control ("MAC") scheduler and a fronthaul physical layer coordinator. The fronthaul physical layer coordinator can include a fronthaul physical layer scheduler, which can allocate spatial resources by determining the specific remote unit(s) that should serve a given mobile device. The MAC scheduler can allocate time/frequency resources to user devices communicating with the remote units. The fronthaul physical layer coordinator or the MAC scheduler can also
(Continued)

determine the optimal transmission modes remote units can use to serve the user devices.

19 Claims, 16 Drawing Sheets

(58) Field of Classification Search
CPC ......... H04L 47/70; H04L 47/72; H04L 47/74; H04L 47/78; H04L 47/80; H04L 47/22; H04L 47/225; H04L 47/18; H04L 47/52; H04W 28/02
USPC ........ 370/229–236, 254, 255, 280, 311, 314, 370/328, 330, 331, 338, 410, 426, 437, 370/469
See application file for complete search history.

(56) References Cited

U.S. PATENT DOCUMENTS

| | | |
|---|---|---|
| 6,731,904 B1 | 5/2004 | Judd |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,398,106 B2 | 7/2008 | Conyers et al. |
| 7,423,988 B2 | 9/2008 | Hedin et al. |
| 7,424,307 B2 | 9/2008 | Hedin et al. |
| 7,474,891 B2 | 1/2009 | Toms et al. |
| 7,515,643 B2 | 4/2009 | Chung |
| 7,554,946 B2 | 6/2009 | Conyers et al. |
| 7,558,356 B2 | 7/2009 | Pollman et al. |
| 7,558,588 B2 | 7/2009 | To et al. |
| 7,574,234 B2 | 8/2009 | Conyers et al. |
| 7,583,735 B2 | 9/2009 | Bauman et al. |
| 7,593,450 B2 | 9/2009 | Conyers et al. |
| 7,603,127 B2 | 10/2009 | Chung et al. |
| 7,626,926 B2 | 12/2009 | Abi-Nassif et al. |
| 7,640,019 B2 | 12/2009 | Conyers et al. |
| 7,672,682 B2 | 3/2010 | Sharma et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,787,854 B2 | 8/2010 | Conyers et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,036,156 B2 | 10/2011 | Hedin et al. |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| RE44,398 E | 7/2013 | Conyers et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,593 B2 | 12/2013 | Ch'ng et al. |
| 8,688,809 B2 | 4/2014 | Ch'ng et al. |
| 8,693,987 B2 | 4/2014 | Chiussi et al. |
| 8,718,697 B2 | 5/2014 | Srinivas et al. |
| 8,731,574 B2 | 5/2014 | Ch'ng et al. |
| 8,750,271 B2 | 6/2014 | Jones |
| 8,774,134 B2 | 7/2014 | Raghothaman et al. |
| 8,781,483 B2 | 7/2014 | Ch'ng |
| 8,805,371 B2 | 8/2014 | Richardson et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 8,953,566 B2 | 2/2015 | Hegde et al. |
| 8,971,796 B2 | 3/2015 | Judd et al. |
| 9,078,284 B2 | 7/2015 | Richardson |
| 9,166,799 B2 | 10/2015 | Kim |
| 2006/0003794 A1 | 1/2006 | Chung et al. |
| 2007/0097916 A1 | 5/2007 | Eyuboglu et al. |
| 2008/0159236 A1 | 7/2008 | Ch'ng et al. |
| 2008/0162924 A1 | 7/2008 | Chinitz et al. |
| 2009/0034440 A1 | 2/2009 | Samar et al. |
| 2009/0116445 A1 | 5/2009 | Samar et al. |
| 2009/0156218 A1 | 6/2009 | Garg et al. |
| 2009/0170440 A1 | 7/2009 | Eyuboglu et al. |
| 2009/0170475 A1 | 7/2009 | Ch'ng et al. |
| 2009/0186626 A1 | 7/2009 | Raghothaman |
| 2010/0075658 A1 | 3/2010 | Hou et al. |
| 2010/0157825 A1 | 6/2010 | Anderlind et al. |
| 2010/0157941 A1 | 6/2010 | Raghothaman et al. |
| 2010/0165957 A1 | 7/2010 | Hedge et al. |
| 2010/0167771 A1 | 7/2010 | Raghothaman et al. |
| 2010/0167777 A1 | 7/2010 | Raghothaman et al. |
| 2010/0177731 A1 | 7/2010 | Ananthaiyer et al. |
| 2010/0242103 A1 | 9/2010 | Richardson et al. |
| 2010/0290389 A1 | 11/2010 | Hou et al. |
| 2010/0329132 A1 | 12/2010 | Raghothaman et al. |
| 2012/0213128 A1 | 8/2012 | Miyata |
| 2013/0136104 A1 | 5/2013 | Samar et al. |
| 2013/0171996 A1 | 7/2013 | Richardson et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2014/0269322 A1* | 9/2014 | Li .................. H04W 28/08 370/236 |
| 2016/0037550 A1 | 2/2016 | Barabell et al. |

(56) References Cited

U.S. PATENT DOCUMENTS

2016/0302088 A1    10/2016  Eyuboglu et al.
2016/0309347 A1    10/2016  Eyuboglu et al.
2016/0345342 A1    11/2016  Eyuboglu et al.
2017/0135121 A1     5/2017  Eyuboglu et al.

OTHER PUBLICATIONS

International Search Authority, "International Preliminary Report on Patentability for PCT Application No. PCT/IB2014/064785", "from Foreign Counterpart to U.S. Appl. No. 15/024,548", dated Apr. 7, 2016, pp. 1-8, Published in: WO.

European Patent Office, "Communication Pursuant to Article 94(3) EPC for EP Application No. 14793621.5", "Foreign Counterpart to U.S. Appl. No. 15/024,548", dated Apr. 25, 2017, pp. 1-5, Published in: EP.

Eyuboglu, "Controlling Data Transmission in Radio Access Networks", "U.S. Appl. No. 14/961,448, filed Dec. 7, 2015", Dec. 7, 2015, pp. 1-51, Published in: US.

European Patent Office, "Summons to Attend Oral Proceedings Pursuant to rule 115(1) for EP Application No. 14793621.5", "Foreign Counterpart to U.S. Appl. No. 15/024,548", filed Mar. 23, 2018, pp. 1-5, Published in: EP.

* cited by examiner

|  | TIME/FREQUENCY RESOURCES (MAC) | REMOTE UNIT #1 (FPC) | REMOTE UNIT #2 (FPC) | REMOTE UNIT #3 (FPC) |
|---|---|---|---|---|
| USER #1 | PRB#1 | X | | |
| USER #2 | PRB#2 | | X | |

DISTRIBUTED PROCESSING IN A CENTRALIZED RADIO ACCESS NETWORK

CROSS-REFERENCE TO RELATED APPLICATIONS

This disclosure claims priority to U.S. Provisional Application Ser. No. 61/881,598, filed Sep. 24, 2013 and titled "Distributed Processing In A Centralized Radio Access Network," and PCT Application Serial No. PCT/IB2014/064785, filed Sep. 23, 2014 and title "Distributed Processing In A Centralized Radio Access Network," the contents of which are hereby incorporated by reference.

TECHNICAL FIELD

The disclosure relates generally to telecommunications and, more particularly (although not necessarily exclusively), to distributed processing among components in a centralized (i.e., cloud) radio access node for coordinating a fronthaul physical layer.

BACKGROUND

Telecommunications systems can include, among other types, a centralized (or cloud) radio access network, which may be referred by its acronym, C-RAN, for providing wireless signal coverage in an area. A C-RAN can include centralized baseband processing units (or one such unit) in a base station pool in communication with remote radio heads over a fronthaul link. The baseband processing units include processing for all of the protocol layers, which include the physical layer (layer 1), the data link layer (layer 2), and the network layer (layer 3). Managing transport load on the fronthaul link and identifying an optimized processing distribution in a C-RAN can be challenging.

SUMMARY

In one aspect, a centralized radio access network is provided. The centralized radio access network can include a media access control scheduler. The centralized radio access network can also include a fronthaul physical layer coordinator positioned between the MAC scheduler and a plurality of remote units. The fronthaul physical layer coordinator includes a fronthaul physical layer scheduler for determining at least one remote unit of the plurality of remote units to serve a mobile device.

In another aspect, a wireless distribution system is provided. The wireless distribution system can include a baseband pool for transceiving signals with a backhaul network, the baseband pool including a media access control scheduler. The wireless distribution system can also include remote units configured for providing wireless signal coverage for mobile devices in a coverage area. The wireless distribution system can further include a fronthaul physical layer coordinator positioned in a fronthaul network between the baseband pool and the remote units. The fronthaul physical layer coordinator is configured for forming an allocation plan for allocating physical layer processing among components of the wireless distribution system based on a traffic condition of the wireless distribution system.

In another aspect, a method is provided. The method can include detecting a traffic condition of a centralized radio access network by a fronthaul physical layer coordinator between a media access control scheduler and a plurality of remote radio heads. The method can also include formulating a physical layer processing allocation plan by the fronthaul physical layer coordinator based on the traffic condition. The method can also include determining at least one remote radio head of the plurality of remote radio heads to serve a mobile device by the fronthaul physical layer coordinator.

BRIEF DESCRIPTION OF THE DRAWINGS

FIG. 13 is a table showing time/frequency and spatial allocation for user devices according to one aspect.

DETAILED DESCRIPTION

Figure 1:
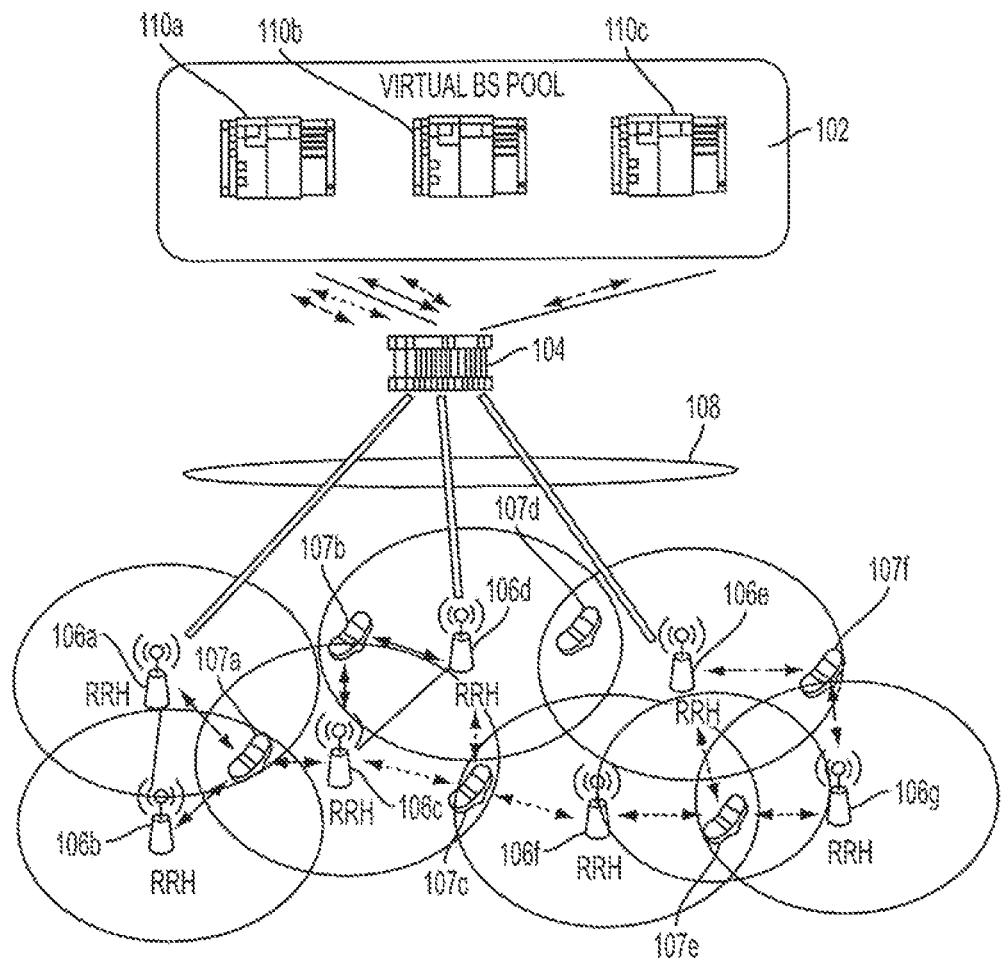
FIG. 1 is a schematic diagram of an example of a centralized radio access network for dynamically allocating protocol layer processing according to one aspect.

Certain aspects and examples are directed to a centralized (or cloud) radio access network ("C-RAN") that can flexibly and dynamically allocate protocol layer processing among one or more baseband processing units and remote radio heads of the C-RAN. Protocol layer processing may be allocated based on, among other things, traffic conditions experienced by the network, transmission modes, network performance, power consumption or a combination of these and other factors. In some aspects, protocol layer processing can be allocated automatically and dynamically without user intervention by detecting a network condition and outputting a command to allocate protocol layer processing among network components substantially contemporaneously with detecting the network condition. Dynamically allocating protocol layer processing can help alleviate issues involving fronthaul link resources. A fronthaul link can include a communication path, including a communication medium and processing components, from a backhaul link to radiating antennas for providing wireless signal coverage. For example, dynamically allocating protocol layer processing can help increase the speed of the processing and communication of data from the backhaul link to the fronthaul link.

In some aspects, the C-RAN includes a fronthaul physical (also known as "PHY") layer coordinator and one or more media access control (MAC) schedulers. The fronthaul physical layer coordinator can detect traffic condition information in the C-RAN and can determine a split of the physical layer processing between the fronthaul physical layer coordinator and the remote radio head. The fronthaul physical layer coordinator can include one or more physical layer schedulers that can determine the optimal remote radio head to serve a given mobile device. For example, the fronthaul physical layer coordinator can determine processing allocation based on the decisions of the physical layer scheduler about which remote units are serving a given user device, about from which remote unit would be better to serve a given user device, or a combination of these. One or multiple remote radio heads can be determined to serve a given user device. In some aspects, a remote unit of a type that is different from a remote radio head can be used. The fronthaul physical layer coordinator can also determine the optimal remote radio head to serve a given mobile device by comparing received power levels of uplink signals transmitted by user devices and measured by the different remote radio heads. The remote radio head(s) that measured the highest uplink power level from the user device transmissions can be selected by the fronthaul physical layer coordinator to serve the mobile device.

In other aspects, the fronthaul physical layer coordinator or MAC scheduler can determine an optimal transmission mode used by remote radio heads to serve user devices. For example, by comparing uplink received power levels from the user devices in a coverage area, the fronthaul physical layer coordinator or MAC scheduler can determine whether to serve user devices via multiple remote radio heads (such as by using MIMO modes), single antenna transmissions (such as by using a SIMO mode), or joint processing of signals via multiple remote radio heads.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions may be used to describe the illustrative aspects but, like the illustrative aspects, should not be used to limit the present disclosure.

FIG. 1 depicts an example of a C-RAN according to one aspect. The C-RAN includes a virtual base station pool 102, a transport module 104, and remote radio heads 106a-g. The remote radio heads 106a-g can wirelessly transceive signals with user devices 107a-f to provide wireless coverage. Any number of remote radio heads 106a-g, including one, can be used.

Between the transport module 104 and the remote radio heads 106a-g is a communication medium 108. The communication medium can include one or more communication links. Examples of the communication links include optical fiber, coaxial cable, wireless links, or a combination of these. Other types of communication links can be used. The transport module 104 and the communication medium 108 can form at least part of the fronthaul for the C-RAN.

In the virtual base station pool 102 are processing units 110a-c. The processing units 110a-c can include baseband processing units, multi-standard radio processing resources, backhaul interface management resources, and fronthaul interface management resources. Included in these resources are one or more MAC schedulers and a fronthaul physical layer coordinator that can implement multi-radio access techniques, multi-mobile network operator layer 2 and layer 3 functionalities, self-optimizing network procedures, and operation and management procedures, among others. The system may also implement multi-mobile operator layer 1 functionalities. The fronthaul physical layer coordinator can dynamically allocate physical layer processing among the virtual base station pool 102 and the remote radio heads 106a-g. The processing units 110a-c can be implemented using software-specific hardware resources or general purpose, processor-based platforms, which can enable real time system reconfiguration. Real time system reconfiguration can include redistributing physical layer processing among components within the C-RAN substantially instantaneously with respect to a condition change. Examples of software-specific hardware resources include a digital signal processor, a field-programmable gate array, and an application-specific integrated circuit. An example of the general purpose, processor-based platforms is a microprocessor, such as an Intel x86 microprocessor.

Figure 2:
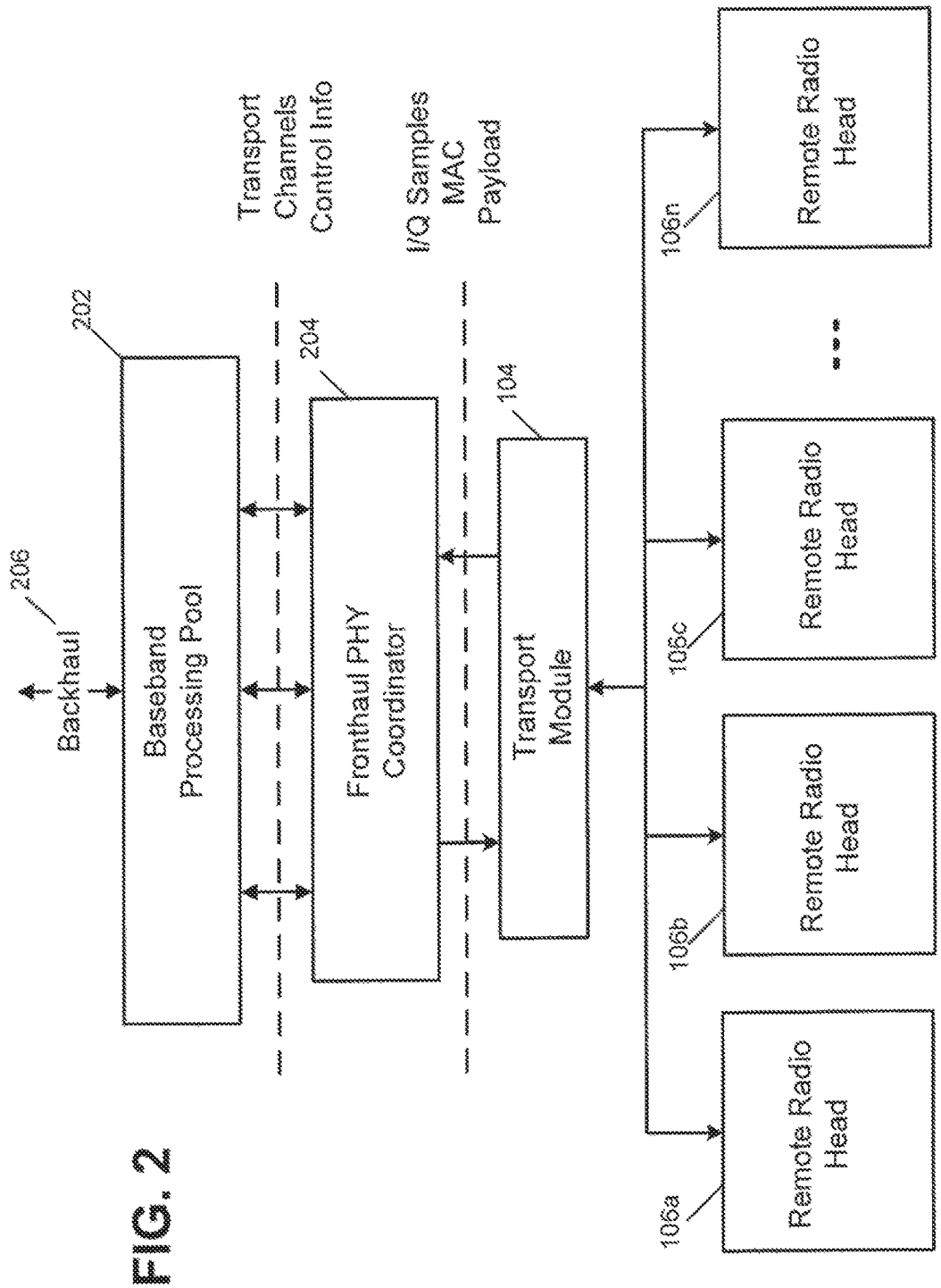
FIG. 2 is a block diagram of a centralized radio access network for dynamically allocating protocol layer processing according to one aspect.

FIG. 2 is a block diagram that depicts an example of certain components of the C-RAN according to one aspect. Included in FIG. 2 are the transport module 104 and remote radio heads 106a-n. Also included in FIG. 2 are a baseband processing pool 202 and a fronthaul physical layer coordinator 204, which may be in the virtual base station pool 102 of FIG. 1. In other aspects, one or both of the baseband processing pool 202 and the fronthaul physical layer coordinator 204 are separate from the virtual base station pool 102 of FIG. 1.

The baseband processing pool 202 can receive signals from, and transmit signals to, a telecommunications backhaul 206. The baseband processing pool 202 can transceive transport channels and control information with the fronthaul physical layer coordinator 204. The transport channels can include sectorized signals. In FIG. 2, three sectors are represented. The fronthaul physical layer coordinator 204 can process the sectorized signals and transceive baseband signals (i.e., in-phase/quadrature ("I/Q") samples) that can also include MAC payload information with the transport module 104, which communicates signals with the remote radio heads 106a-n.

The fronthaul physical layer coordinator 204 can perform multi-radio access techniques and multi-cell physical layer (i.e., L1) processing. The fronthaul physical layer coordinator 204 can optimize the physical layer processing and fronthaul transport load. For example, the fronthaul physical layer coordinator 204 can determine the distributed architecture of the C-RAN, such as by detecting the number and location of remote radio heads 106a-n and which remote radio heads 106a-n are serving user devices, and can adapt the physical layer processing to the distributed architecture and network conditions. The fronthaul physical layer coordinator 204 can also schedule and route the physical layer resources across the different remote radio heads 106a-n through cell and sector identification (e.g., by matching virtual antenna ports identified by reference and synchronization signals with physical antennas), multiple-input-multiple-output ("MIMO") spatial streams (e.g., according to different LTE-A transmission modes, including coordinated multi-point and multi-user MIMO), and carrier frequencies (including component carriers for a Carrier Aggregation feature). The fronthaul physical layer coordinator 204 may also select and track the optimal remote radio heads to serve each user device throughout the coverage area.

The fronthaul physical layer coordinator 204 may include one or more physical layers schedulers. In a multiple physical layer scheduler implementation, each of physical layer schedulers can implement the physical layer processing of a specific cell. The physical layer coordinator 204 can monitor the physical layer schedulers and the MAC schedulers, and can react according to the decisions of these schedulers. In case of multi-operator system configurations, the coordinator functionalities can be shared among the operators as well as the signal distribution and remote unit infrastructure.

Figure 3:
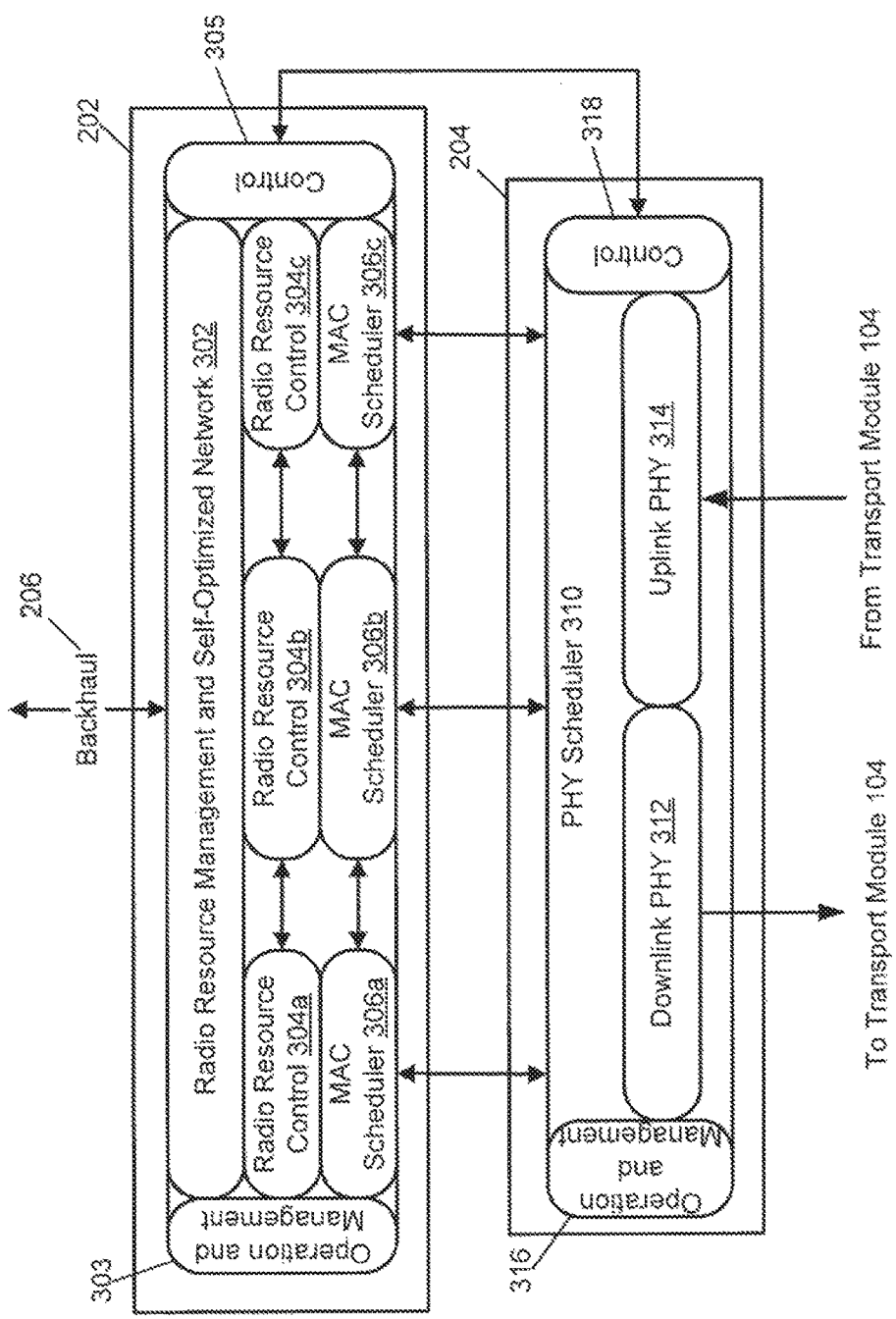
FIG. 3 is a block diagram of a baseband pool and a physical layer coordinator according to one aspect.

FIG. 3 is a functional block diagram of examples of the baseband processing pool 202 and the fronthaul physical layer coordinator 204. The baseband processing pool 202 can receive signals from the backhaul 206 and include radio resource management and self-optimized network components 302 that perform processes on the received signals. For example, a radio resource management component can perform system level control of channel interference by controlling signal power. The self-optimized network component can process the signals to optimize the signals for transmission within the network.

The received signals can include signals for multiple sectors. The baseband processing pool 202 can include radio resource control components 304a-c that can perform processes for each sector. In FIG. 3, three sectors are represented as an example only. Radio resource control components 304a-c may apply a protocol that handles control plan signaling of Layer 3 processing between mobile devices and the backhaul 206. For example, the radio resource control components 304a-c can establish and disconnect connections with mobile devices and broadcasting system information, among others.

The baseband processing pool 202 includes operations and management component 303 and a control component 305 that can control other components in the baseband processing pool 202 and provide management information for transmission to other subsystems within the telecommunication system.

The baseband processing pool 202 also includes MAC schedulers 306a-c. In this example, the baseband processing pool 202 includes three MAC schedulers 306a-c, one for each sector. In other aspects, the baseband processing pool 202 includes any number of MAC schedulers 306a-c, including one. The fronthaul physical layer coordinator 204 can include a physical layer scheduler component 310, a downlink physical layer component 312, an uplink physical layer component 314, an operation and management component 316, and a control component 318. Although one physical layer scheduler component 310 is shown, fronthaul physical layer coordinators can include any number of physical layer scheduler components. For example, a fronthaul physical layer coordinator can include one physical layer scheduler per sector. In some aspects, a physical layer coordinator can include a master physical layer scheduler for all cell identifiers in the network, or a physical layer scheduler for each cell identifier.

The operations and management component 316 and the control component 318 can control the components in the fronthaul physical layer coordinator 204 and provide management information for transmission to other subsystems within the telecommunication system. For example, the control component 318 can output control signals to, and receive control signals from, the control component 305 in the baseband processing pool.

The physical layer scheduler component 310 can detect network information based on signals received and transmitted by the fronthaul physical layer coordinator 204. Examples of network information can include signal traffic conditions and loads, the presence of mobile devices in the coverage area and the identification of the remote radio head serving each of the mobile devices, etc. The physical layer scheduler component 310 can determine a proposed layer processing allocation plan based on the network information. The physical layer scheduler component 310 can provide the proposed layer processing allocation plan to one or more of the MAC schedulers 306a-c. For a given cell, a MAC scheduler can allocate for a mobile device the time (e.g., slot units) and frequency (e.g., subcarriers) resources, while the physical layer scheduler component 310 can allocate space resources for serving the mobile device (e.g., by mapping virtual antenna ports into the antenna ports of remote units). The physical layer scheduler component 310 may also suggest where to perform the physical layer processing in the system. The physical layer scheduler component 310 may also provide the network information to one or more of the MAC schedulers 306a-c. The MAC schedulers 306a-c can determine a layer processing allocation plan based on the proposed layer processing allocation plan and, in some aspects, the network information received from the physical layer scheduler component 310, the system architecture and which remote radio heads are serving user devices. The MAC schedulers 306a-c can cause the system to implement the layer processing allocation plan by causing certain types of layer processing to be performed in one component and other types of layer processing to be performed in another.

In some aspects, the system can be configured such that the fronthaul physical layer coordinator 204 is a master entity that can decide by itself (through the physical layer scheduler component 310) where to perform the physical layer processing in the system and from which antenna port (and consequently from which remote unit) to serve a specific mobile device in the network. In this case, a MAC scheduler may just allocate time and frequency resources to the mobile device within its serving cell.

In mobile user device cell attachment to the wireless network, all of the remote units (i.e., all the antenna ports) may be used to serve the mobile device. The physical layer scheduler component 310 can begin to measure the uplink signals (including control and data channels, and reference and sounding signals) from the mobile device. Based on these measurements, the physical layer scheduler component 310 can select which antenna ports/remote units are to be used to serve the mobile device. In some aspects, a remote unit can include one or more antenna ports, of which the physical layer scheduler component 310 can map. As the mobile device is moving throughout the wireless coverage area, the physical layer scheduler component 310 can track the changing channel conditions and may decide to serve the mobile device from a different antenna port/remote unit configuration. In other aspects, the network administrator may force the system to use specific antenna ports/remote units to serve a mobile device, regardless of the measurements and decisions of the physical layer scheduler component 310.

Examples of physical layer processing functions include, among others, forward error correction, quadrature amplitude modulation multi-antenna mapping and processing, resource mapping, resource demapping, cyclic prefix extraction, fast Fourier transform, inverse fast Fourier transform, baseband to radio frequency processing, radio frequency to baseband processing, and encoding to standardized baseband signals, among others. The MAC schedulers 306a-c using the physical layer scheduler component 310 can cause the physical layer processing functions to be physically shared and exchanged among the fronthaul physical layer coordinator 204 and remote radio heads, depending on network load conditions and transmission features being implemented, for example. Each remote radio head can implement full, partial, or no downlink and uplink physical layer processing functions. For example, a remote radio head implementing no physical layer processing functions can perform only basic radio frequency front-end functionalities.

The downlink physical layer component 312 can transmit signals to the transport module 104 for transport to remote radio heads. The uplink physical layer component 314 can receive signals from the transport module 104.

Figure 4:
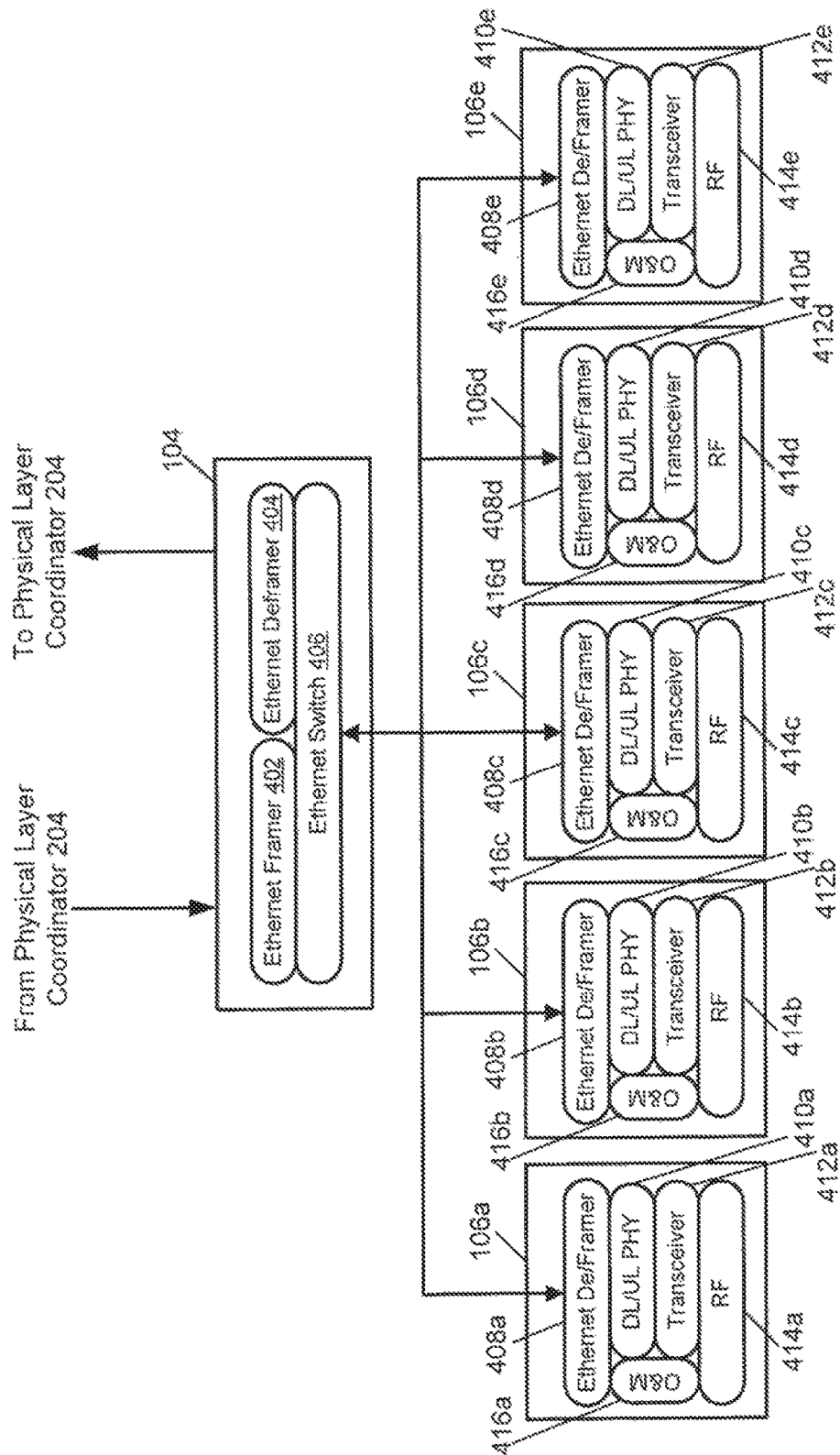
FIG. 4 is a block diagram of a transport module and remote radio heads according to one aspect.

Shown by block diagram in FIG. 4 is an example of the transport module 104 and remote radio heads 106a-e. The transport module 104 can receive signals from the fronthaul physical layer coordinator 204. The transport module 104 includes an Ethernet framer 402, an Ethernet deframer 404, and an Ethernet switch 406. The Ethernet framer 402 can frame signals received from the fronthaul physical layer coordinator 204. The Ethernet switch 406 can transport the framed signals to the proper remote radio head or remote radio heads of the remote radio heads 106a-e according to information in the framed signals or control information received from the fronthaul physical layer coordinator 204. The Ethernet switch 406 can also receive framed uplink signals from one or more of the remote radio heads 106a-e.

The remote radio heads 106a-e include Ethernet deframer/framers 408a-e, downlink and uplink physical layer processing components 410a-e, transceivers 412a-e, RF components 414a-e, and operations and management components 416a-e.

The Ethernet deframer/framers 408a-e can receive downlink signals in Ethernet frames from the transport module 104 and deframe the downlink signals. The Ethernet deframer/framers 408a-e can also frame uplink signals for transport to the transport module 104.

The downlink and uplink physical layer processing components 410a-e can perform physical layer processing on uplink signals and downlink signals according to commands received from one or more MAC schedulers. For example, the downlink and uplink physical layer processing components 410a-e can implement full, partial, or no physical layer processing. In a situation of a "hot spot" service area where no simulcast (i.e., all remote radio heads are relaying the same sector, which is also referred to herein as "cell") is desired, for example, the remote radio head 106a-e can be configured in a small cell, node-like configuration with integrated full physical layer processing. For example, "hot spot" areas can be served by a single remote unit, such as a remote radio head of the remote radio heads 106a-e, implementing the full physical layer processing (i.e., in "small cell" mode). The fronthaul physical layer coordinator 204 can determine to switch "on" specific remote radio heads in a "small cell" mode and during certain periods of high traffic load. The "small cell" mode can optimize the transport load because user device payload, rather than complex in-phase and quadrature samples, can be transferred on the fronthaul network. The system can switch back to a typical C-RAN mode as the traffic load drops below a pre-set threshold.

For areas with more uniform user device distribution, for example, a simulcast transmit configuration may be used and all physical layer processing is centralized in the fronthaul physical layer coordinator and the remote radio heads 106a-e can operate as RF front-end components so that identical full physical layer processing at multiple remote radio heads can be avoided. Full physical layer downlink physical layer processing at the remote radio heads 106a-e may be implemented for downlink Coordinate Multi-Point (CoMP) transmission features (i.e., coordinated scheduling, coordinated beam-forming, dynamic scheduling, and joint processing) of LTE-Advanced. Full downlink physical layer processing at the fronthaul physical layer coordinator may be used for downlink CoMP transmissions between remote radio heads within the same cell as well as between different cells.

In the uplink, full physical layer processing may be implemented in remote radio heads for non-uplink CoMP user devices, which may not be served by more than one remote radio head at the same time. For uplink CoMP user devices (i.e., uplink joint processing), the remote radio heads may perform partial physical layer processing (e.g., fast Fourier transform processing, cyclic prefix extraction and resources demapping), while the remaining physical layer processing functions can be performed at a fronthaul physical layer coordinator.

The transceivers 412a-e can process downlink signals from the downlink and uplink physical layer processing components 410a-e for transmission by the RF components 414a-e, which may be coupled to antennas. For example, the transceivers 412a-e may convert the downlink signals into analog form, up-convert the downlink signals, or otherwise mix the downlink signals with an RF carrier, in addition to or in lieu of other processing. The transceivers 412a-e can also process uplink signals received from the RF components 414a-e and antennas. For example, the transceivers 412a-e can convert the uplink signals to digital form, down-convert the uplink signals, or otherwise prepare the uplink signals for processing by the downlink and uplink physical layer processing components 410a-e.

The operations and management components 416a-e can control signal processing parameters and functions, among other features, of the remote radio heads 106a-e. For example, the operations and management components 416a-e can receive control signals from the fronthaul physical layer coordinator and change the amount of physical layer processing performed by the downlink and uplink physical layer processing components 410a-e.

Referring to FIGS. 3 and 4 together, the fronthaul physical layer coordinator 204 can control routing of different sectors to subsets of remote radio heads 106a-e. For example, MAC scheduler 306a can process a first sector, MAC scheduler 306b can process a second sector, and MAC scheduler 306c can process a third sector. Each of the first sector and third sector may have one to two simulcast factors (i.e., each sector is relayed by two of the remote radio heads 106a-c). The second sector may have a one to one simulcast factor (i.e., the second sector is relayed by one of the remote radio heads 106a-c). For example, remote radio heads 106a-b can relay the first sector, remote radio head 106c can relay the second sector, and remote radio heads 106d-e can relay the third sector. Both intra-cell CoMP transmission mode (i.e., communication between remote radio heads relaying the same sector) and inter-cell CoMP transmission mode (i.e., communication between remote radio heads relaying different sectors) can be supported.

Figure 5:
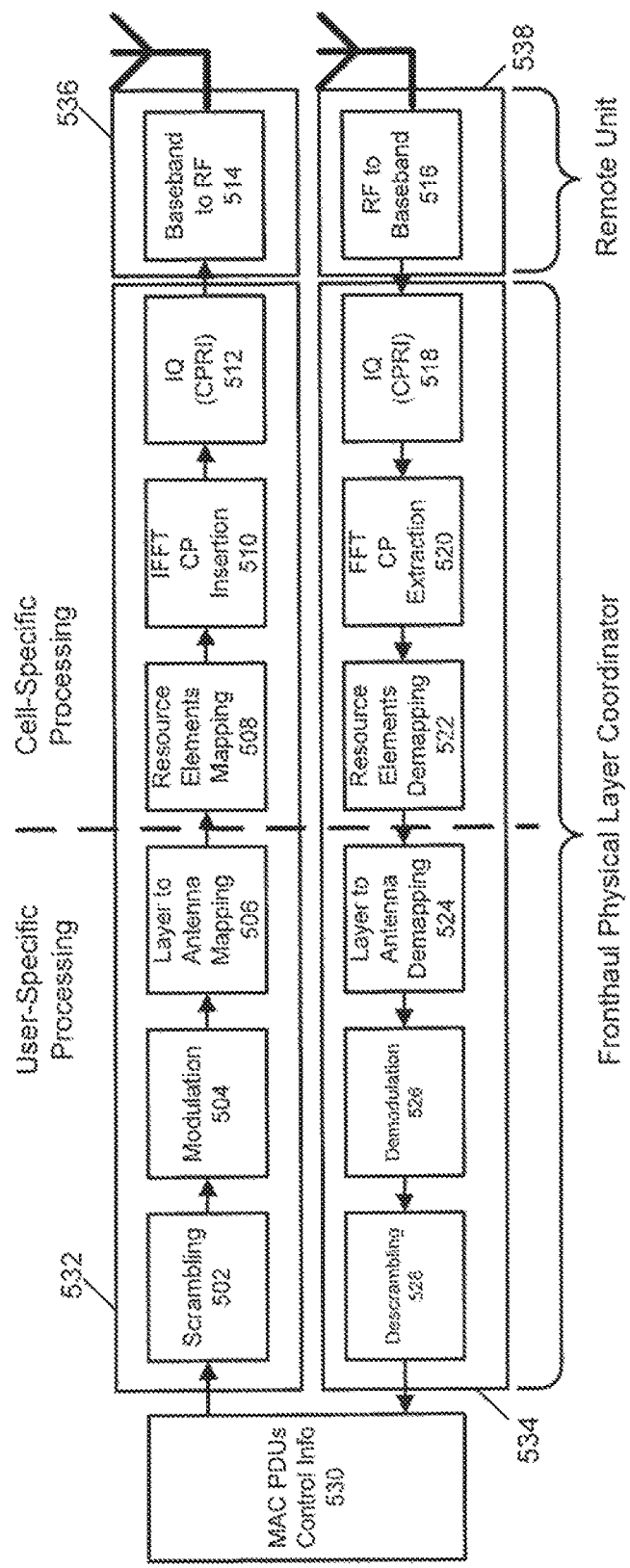
FIG. 5 is a block diagram of an example of physical layer processing allocation in which physical layer processing is fully allocated to a fronthaul physical layer coordinator according to one aspect.
Figure 6:
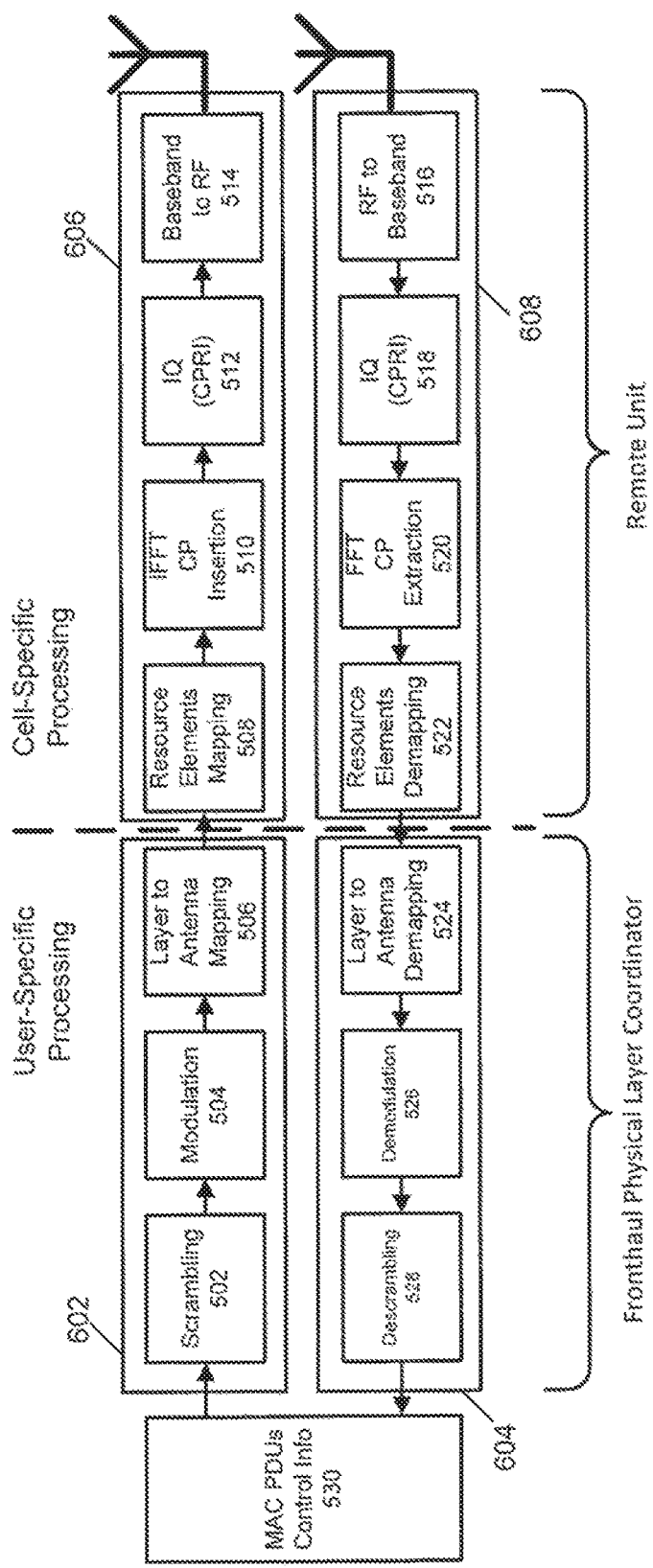
FIG. 6 is a block diagram of an example of physical layer processing allocation in which physical layer processing is partially allocated to a fronthaul physical layer coordinator and partially allocated to a remote unit according to one aspect.
Figure 7:
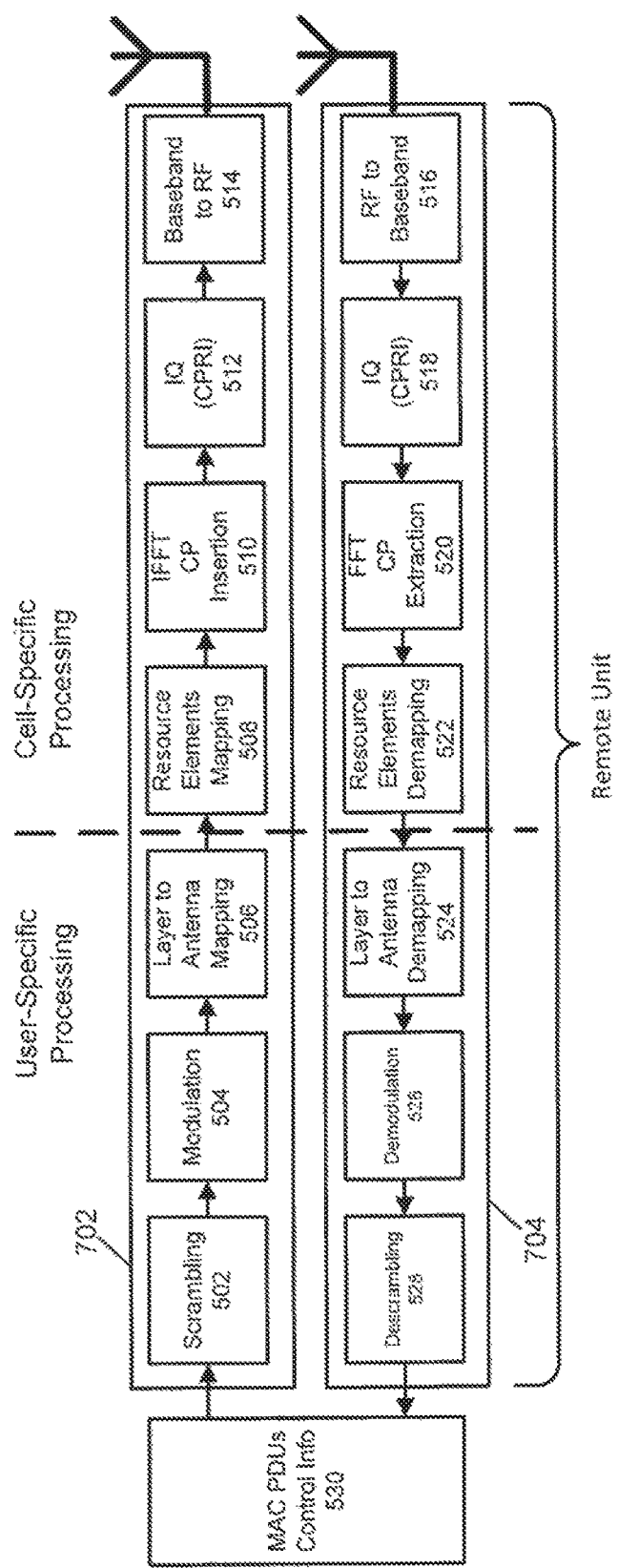
FIG. 7 is a block diagram of an example of physical layer processing allocation in which physical layer processing is fully allocated to a remote unit according to one aspect.

FIGS. 5-7 depict by block diagram examples of physical layer 1 processing functions and examples of distribution of physical layer processing functions. The physical layer 1 processing functions can include user-specific processing functions and cell-specific processing functions. The user-specific processing functions can operate at a physical resource block (PRB) level. The cell-specific processing can operate at a subframe level (e.g., transit time interval of 1 ms).

In the downlink direction, the user-specific processing functions can include scrambling 502, modulation 504, and layer to antenna mapping 506. The cell-specific processing functions in the downlink direction can include resource elements mapping 508, inverse fast Fourier transform (labeled "IFFT") and cyclic prefix insertion 510, and in-phase/quadrature or CPRI processing 512. In the downlink direction there is also basic RF front-end functions, such as baseband to RF processing 514.

In the uplink direction, there can be basic RF front-end functions, such as RF to baseband processing 516. The cell-specific processing functions in the uplink direction can include in-phase/quadrature or CPRI processing 518, fast Fourier transport (labeled "FFT") and cyclic prefix extraction 520, and resource elements demapping 522. The user-specific processing functions can include layer to antenna demapping 524, demodulation 526, and descrambling 528. Also depicted in both uplink and downlink directions is MAC packet data units (PDUs) and control information 530, which can be the data payload provided by the MAC layer to be processed and transmitted by the physical layer. FIG. 5 depicts an example of full physical layer 1 processing occurring at a fronthaul physical layer coordinator. Downlink physical layer processing functions 532 and uplink physical layer processing functions 534 can be performed by the fronthaul physical layer coordinator. Downlink RF front-end processing 536 and uplink RF front-end processing 538 can be performed by a remote unit, such as a remote radio head.

FIG. 6 depicts an example of partial physical layer 1 processing occurring in a fronthaul physical layer coordinator. Downlink user-specific physical layer processing functions 602 and uplink user-specific physical layer processing functions 604 can be performed by the fronthaul physical layer coordinator. Downlink cell-specific processing functions and RF front-end functions 606 and uplink cell-specific processing functions and RF front-end functions 608 can be performed by a remote unit, such as a remote radio head.

FIG. 7 depicts an example of full physical layer 1 processing occurring in a remote unit, such as a remote radio head. Downlink physical layer processing functions and RF front-end functions 702 can be performed by the remote unit. Uplink physical layer processing functions and RF front-end functions 704 can be performed by the remote unit.

For each cell identifier and remote unit, the system can implement physical layer processing at the fronthaul physical layer coordinator and remote unit, depending, for example, on the specific load conditions on the fronthaul, as well as on the air interface. Optimization of both fronthaul transport and remote unit processing load can be achieved. This optimization may be also be targeted to reduce the power consumption of the whole system.

Figure 8:
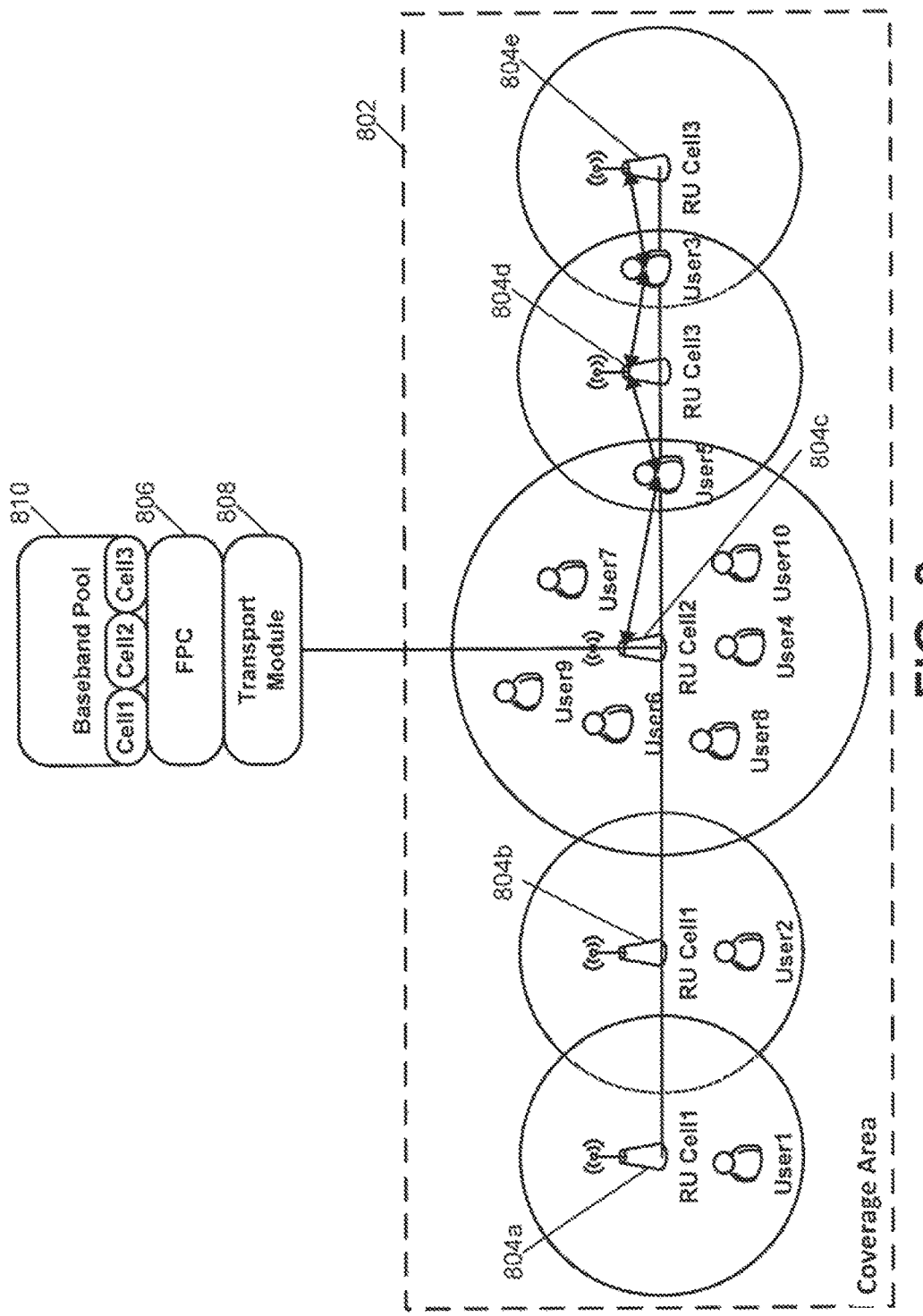
FIG. 8 is a schematic diagram of a centralized radio access network that can provide coverage to user devices in a coverage area according to another aspect.

FIG. 8 depicts an example remote unit configuration serving user devices in a coverage area 802. Five remote units 804a-e are shown in the coverage area 802 serving ten user devices (referred to in FIG. 8 as User1 to User10), as an example. Communicating with the remote units 804a-e through a fronthaul physical layer coordinator (labeled "FPC") 806 and a transport module 808 is a baseband pool 810 that includes three cells (Cell1, Cell2, Cell3).

The baseband pool 810 and the fronthaul physical layer coordinator 806 can receive downlink and uplink transport channels and control information. The fronthaul physical layer coordinator 806 can use the control information about downlink and uplink time and frequency resources assignment for each served user device provided by MAC layers as part of downlink control information and uplink control information messages. Since the final decisions about the time and frequency resource assignment and transmission mode selection for each served user device is made by a MAC scheduler in the baseband pool 810, the physical layer scheduler in the fronthaul physical layer coordinator 806 can interact with the MAC s scheduler (e.g., by specific Application Programming Interfaces). The final scheduling for user devices can be realized according to a joint process between the MAC scheduler and the physical layer scheduler. The two schedulers can make two different levels of decisions because the schedulers act across different dimensions (e.g., MAC scheduler over time/frequency and physical layer scheduler over space). Their joint/combined decisions can determine the final scheduling for the mobile device. There can be both downlink and uplink schedulers for each MAC and physical layer so that uplink and downlink optimal resource allocations may differ.

For a given cell/sector in the network, the different duties of MAC and physical layer schedulers can be split. Among the other functions the MAC scheduler can be in charge of allocating time and frequency resources, of implementing the Adaptive Modulation and Coding (AMC) function and the selection of a transmission mode (e.g., scheduling user devices on one or more remote units and determining whether to share PRB levels via transmission modes such as SU-MIMO, MU-MIMO, SISO, TX Diversity, CoMP and others). The physical layer scheduler can be in charge of identifying the best selection of antenna ports/remote units for serving the user device in the network. For example, the physical layer scheduler, as part of the fronthaul physical layer coordinator 806, can exploit physical layer channels, signals and measurements for a given cell. In some aspects, there are multiple physical layer schedulers, one for each cell/sector, but one fronthaul physical layer coordinator 806. In some aspects, the physical layer scheduler can be in charge of selecting the optimum transmission mode.

Once the physical layer scheduler selects the antenna port/remote units serving a specific mobile device attached to a cell, and the MAC scheduler allocates the time/frequency resources for it, the fronthaul physical layer coordinator can enable transmission/reception over those time/frequency resources on each antenna port/remote unit and of disabling transmission/reception over the same time/frequency resources on the other antenna port/remote unit, unless the transmission mode selected by the MAC scheduler requires the use of multiple antennas/remote units (e.g., SU-MIMO, CoMP, TX/RX Diversity and others).

The user-related MAC scheduler information can be included in the downlink control information channel, which can be derived by the fronthaul physical layer coordinator 806 to enable/disable transmission/reception on the antenna ports/remote units. For example, the MAC scheduler can dynamically allocate resources for user device at each transit time interval via Cell Radio Network Temporary Identifier (C-RNTI) on Physical Downlink Control Channel (PD-CCH). The MAC scheduler can attempt to schedule all user device for which data is to be transmitted in the downlink. User device can monitor the PDCCH to find possible allocation when its downlink reception is enabled. User device can scan through the contents of PDCCH for downlink control information associated with its C-RNTI. The downlink control information can provide information such as resource allocation type, bitmap for allocation, modulation and coding scheme, transmission mode, and index to a hybrid automatic repeat request process and transmit power commands. Resource allocation information can provide information to the user device about how and which PDCCH is to be accessed. The MAC scheduler can optimize the user device performance.

The physical layer scheduler can map and route MAC PDU, control information, and physical layer channels across distributed remote units to optimize the fronthaul transport load and remote unit processing. Simultaneously, the physical layer scheduler can enable the MAC schedulers of the different cells to operate optimally. In some aspects, there are multiple physical layer schedulers, one for each cell. In other aspects, there is a master physical scheduler that can control all of the cells in the system.

In the uplink path, the fronthaul link between the fronthaul physical layer coordinator 806 and the remote units 804*a-e* can be limited to a capacity shared among operations and management, any eventual native IP traffic, payload resulting from demodulation inside the remote units of each PRB and uplink fast Fourier transform samples (e.g., resulting from partial physical layer processing inside the remote units of each PRB of uplink CoMP user devices). Uplink fast Fourier transport samples can be allocated dynamically on this reserved channel. If CoMP will not take place between all of the remote units 804*a-e* and for each PRB assigned to the user devices in the coverage area of a remote unit, the fronthaul physical layer coordinator 806 can allocate these resources properly.

In some aspects, the fronthaul physical layer coordinator 806 can provide a quasi-uplink CoMP algorithm that can improve uplink performance. Based on real time analysis of the power received in the uplink PRBs by remote units providing coverage to the same cell identifier, the fronthaul physical layer coordinator 806 can use channel estimation indexes to achieve a maximum gain when jointly processing the fast Fourier transform bins of PRBs coming from multiple remote units. Channel estimation indexes can be retrieved from uplink pilot tones. Uplink pilot tones can be sent to the fronthaul physical layer coordinator 806 from the remote units 804*a-e* in the form of fast Fourier transform bins. The fronthaul physical layer coordinator 806 can jointly process this data when a user device is detected. The detection of a user device in need of joint processing may be based on a threshold level associated with the power from the user device, as detected on a remote unit, and the presence of at least a second remote unit that is detecting the user device at a power level in a certain range.

In some aspects, the fronthaul physical layer coordinator 806 can distinguish between payloads for uplink CoMP user devices and payloads for non-uplink CoMP user devices. Payload of non-uplink CoMP user devices can be fully decoded and forwarded at a remote unit. Payload of uplink CoMP user devices can be only soft-detected (e.g., using uplink fast Fourier transform bins), but not decoded at a remote unit to prevent uplink joint processing at the fronthaul physical layer coordinator 806. In some aspects, fast Fourier transport output frequency bins of uplink CoMP user devices can be further compressed before being transported over the fronthaul. For example, the bins can be re-quantized based on poor signal dynamic because of likely poor coupling between user device and a remote unit in case of uplink CoMP (i.e., higher level bits can be truncated because the bits may not contain information).

In some aspects, the fronthaul physical layer coordinator 806 can allocate multiple component carriers, according to a carrier aggregation feature, across multiple remote units of remote units 804*a-e*. Depending on specific traffic conditions and the co-channel interference levels detected by user devices or by the fronthaul physical layer coordinator 806, a component carrier can be routed only to remote units serving areas with low interference on that component carrier, for example deep indoor areas not affected by surrounding macro-cell interference.

Identifying the Optimal Remote Unit to Serve a Given User Device

In some aspects, the fronthaul physical layer coordinator can identify the best remote unit to serve a specific user device on scheduled PRBs among the multiple remote units that are simulcasting a given cell/sector in the coverage area. The information about the downlink and uplink PRBs allocated for each user device can be contained within the downlink control information message.

For example, in one aspect, the system can be configured so that the fronthaul physical layer coordinator 204 (discussed above with respect to FIG. 2) can identify the best remote unit to serve a user device based on a Physical Random Access Channel ("PRACH") power detection process. User devices can utilize a PRACH process to initiate synchronization with the network. As part of the PRACH process, the user device can transmit a PRACH preamble signal that identifies the user device. The power level of the PRACH preamble signal received at a remote unit can represent the signal strength of the PRACH preamble. The same PRACH preamble signal is received by multiple remote units in the coverage area, and each remote unit may detect a different power level of the PRACH preamble depending on the proximity of the remote unit to the user device. A PRACH preamble with a higher signal strength can indicate that the user device that transmitted the PRACH preamble is close in proximity to the remote unit.

Figure 9:
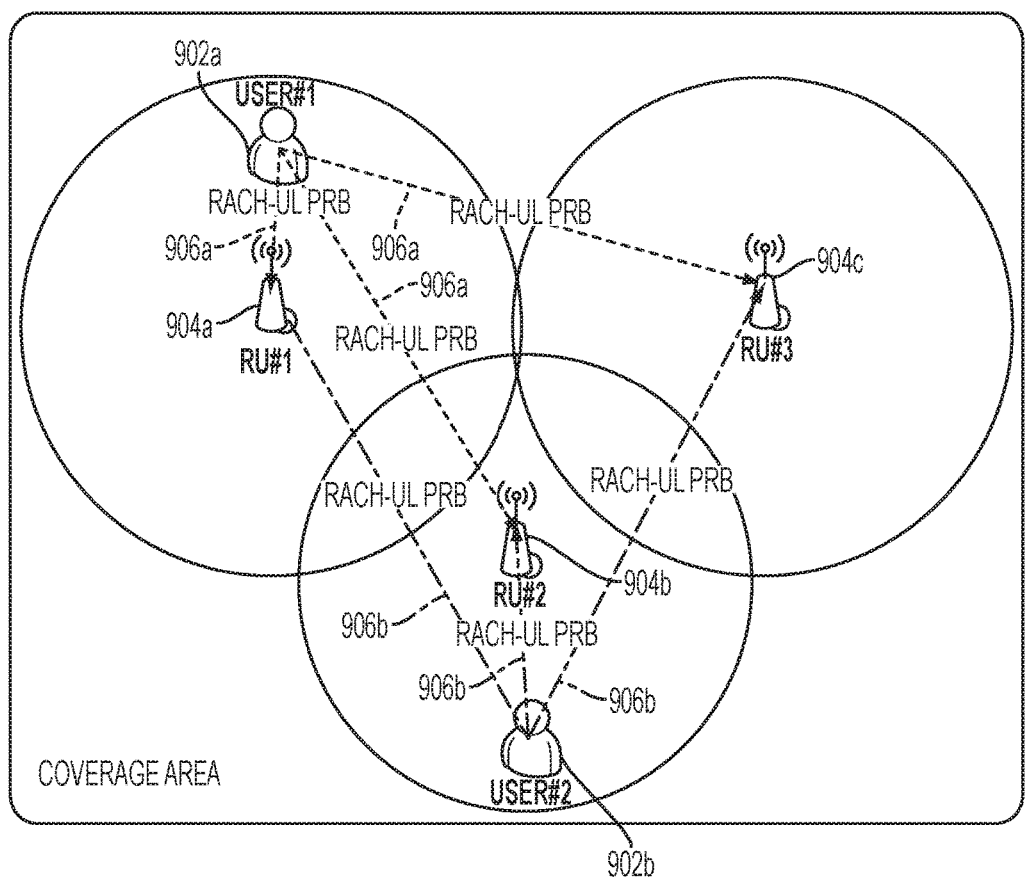
FIG. 9 is a schematic diagram of an environment in which multiple remote units can determine signal power levels of nearby user devices according to one aspect.

For example, FIG. 9 is a schematic diagram of an environment in which multiple remote units 904*a-c* can determine PRACH preamble power levels of nearby user devices 902*a-b* according to one aspect User device 902*a* transmits PRACH preamble 906*a*. The remote units 904*a-c* within the coverage area receive the PRACH preamble 906*a*. Similarly, user device 902*b* transmits PRACH preamble 906*b*, which is also received by the remote units 904*a-c*. As the user device 902*a* is closer in proximity to remote unit 904*a* than to remote units 904*b-c*, the measured power level of PRACH preamble 906*a* may be higher at remote unit 904*a* than the measured power levels at remote units 904*b-c*. Similarly, since the user device 902*b* is closer in proximity to remote unit 904*b* than it is to remote units 904*a*, 904*c*, the measured power level of the PRACH preamble 906*b* may be highest at remote unit 904*b*.

By comparing the power levels of the PRACH preambles received among the multiple remote units in the coverage area, the fronthaul physical layer coordinator can identify the remote unit that received the PRACH preamble with the highest power level and correspondingly the lowest signal path loss. The remote unit that received the PRACH preamble with the highest power level may be the remote unit the fronthaul physical layer coordinator selects to serve the user device. To detect and measure PRACH power levels and provide the measured power levels to the fronthaul physical layer coordinator, the remote units 904a-c can be configured to include PRACH power detection components and provide the power levels to the fronthaul physical layer coordinator via a transport module. For example, FIG. 11 is a block diagram of remote units and the other components of a C-RAN configured for detecting and processing PRACH signals from user devices for a single cell simulcast according to one aspect.

Figure 11:
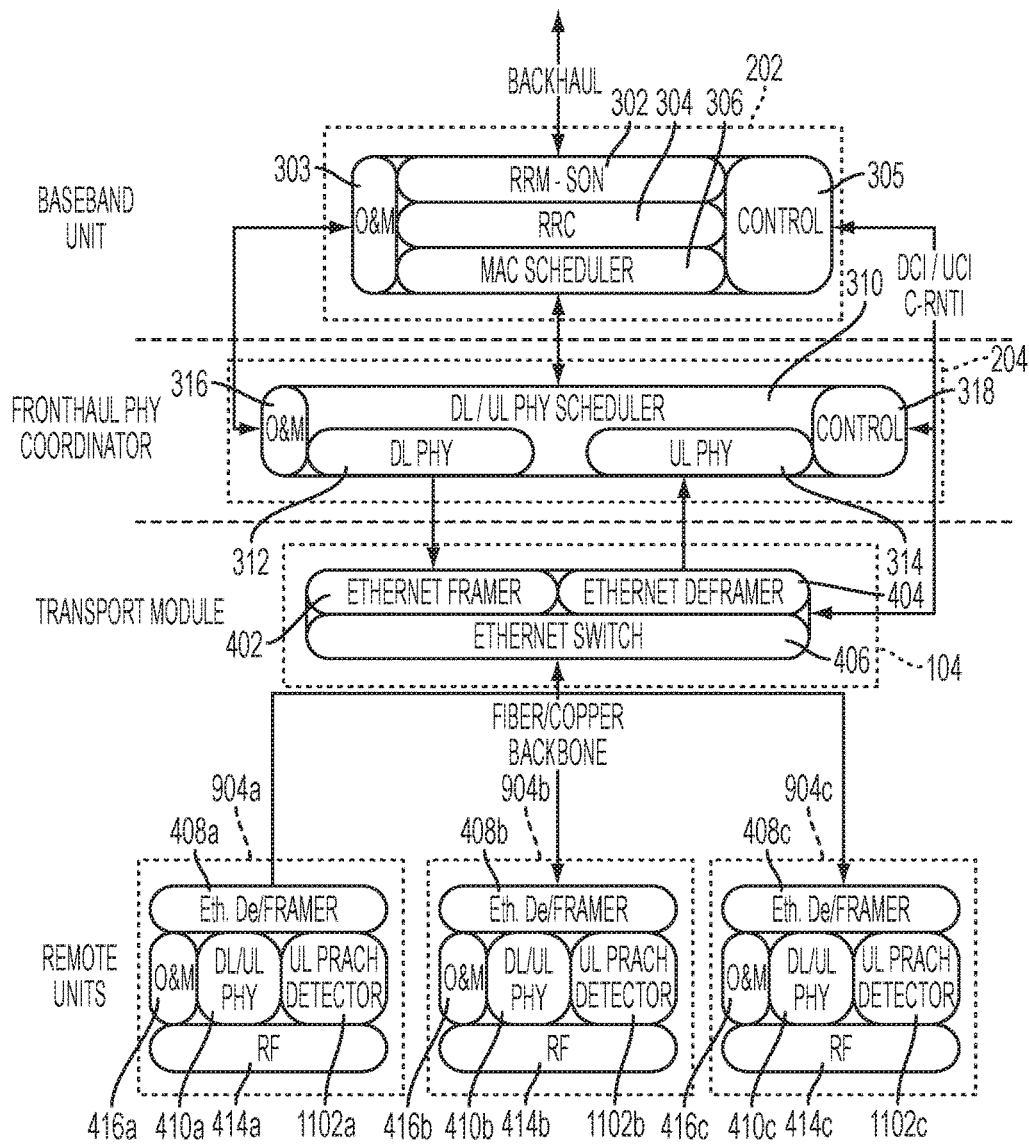
FIG. 11 is a block diagram of remote units, a transport module, a physical layer coordinator, and a baseband pool according to one aspect.

As shown in FIG. 11, remote units 904a-c can include Ethernet deframers/framers 408a-c, downlink and uplink physical layer processing components 410a-c, RF components 414a-c, operations and management components 416a-c (all of which can operate in a similar manner as described previously in connection with FIG. 4). In addition, the remote units 904a-c can include uplink PRACH detectors 1102a-c. Each uplink PRACH detector 1102a-c can detect the same PRACH preamble transmitted by a user device. Once the PRACH preamble is detected, the uplink PRACH detectors 1102a-c can also implement physical layer processing of the PRACH procedure, including identifying the user devices that provided the PRACH preamble and measuring the power level of the received signals.

The remote units 904a-c can provide the measured PRACH preamble power levels to the fronthaul physical layer coordinator 204 via the transport module 104. The transport module can include an Ethernet switch 406, Ethernet framer 402, and Ethernet deframer 404. The fronthaul physical layer coordinator 204 can include a physical layer scheduler component 310, downlink physical layer component 312, uplink physical layer component 314, operations and management component 316, and control component 318. All of the components in the transport module 104 and the fronthaul physical layer coordinator 204 can operate in a similar manner as described previously in connection with FIGS. 3 and 4.

The C-RAN depicted by the block diagram in FIG. 11 can also include a baseband processing pool 202 for additional radio resource management and determining a layer processing allocation plan as discussed above. The baseband processing pool 202 can include self-optimized network components 302, a radio resource control component 304, a MAC scheduler 306, an operation and management component 303, and a control component 305, all of which can operate in a similar manner as described previously with respect to FIG. 3). While FIG. 11 depicts a single MAC scheduler 306 and a single radio resource control component 304 for single cell simulcast, other aspects can include baseband processing pools with multiple radio resource control components and MAC schedulers for multi-cell transmissions.

Figure 10:
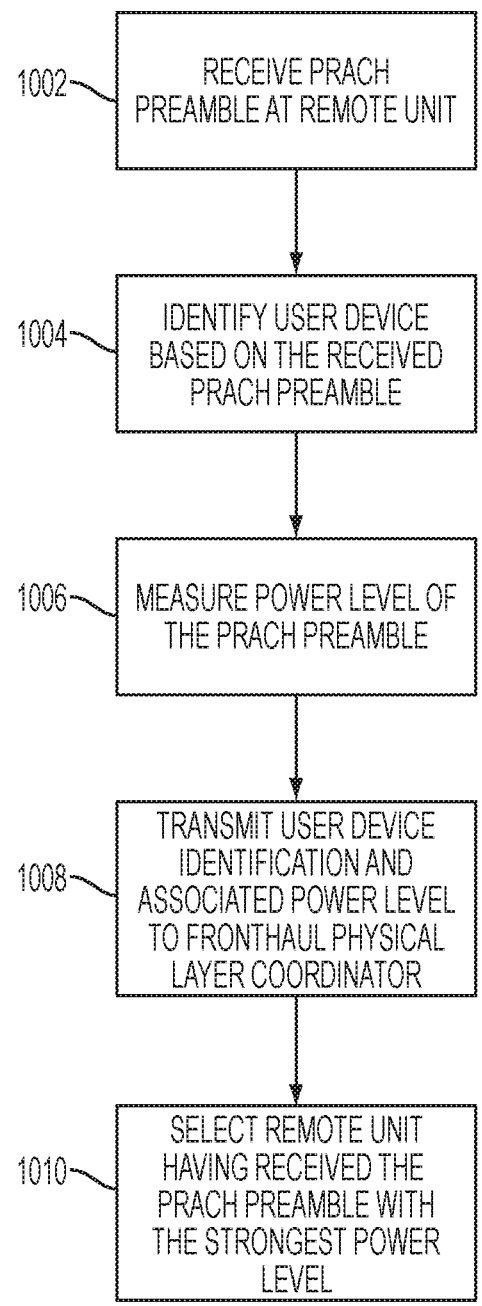
FIG. 10 is a flowchart of an example of a process for identifying a remote unit to serve a mobile user device according to one aspect.

The PRACH preamble power levels measured by remote units 904a-c can be provided to the fronthaul physical layer coordinator 204. In turn, the fronthaul physical layer coordinator 204 can determine the best remote unit to receive transmissions for the user device. FIG. 10 is a flowchart depicting this process.

In block 1002, the remote units 904a-c can receive a PRACH preamble transmitted by user device. The remote units can be configured to include uplink PRACH detectors 1102a-c to receive the PRACH preamble.

In block 1004, a user device can be identified based on the received PRACH preamble. For example, the PRACH preamble can include information indicating the specific user device that provided the signal. The uplink PRACH detectors 1102a-c (shown in FIG. 11) can process the PRACH preamble signals from the user device and extract the signature identifying the user device.

In block 1006, the power level of the received PRACH preamble can be detected. For example, the uplink PRACH detectors 1102a-c can include dedicated power meters that can measure the amplitude of the received signals. A higher signal amplitude can signify a PRACH preamble with a higher power level.

In block 1008, the user device identification and associated power level of the PRACH preamble can be transmitted to the fronthaul physical layer coordinator 204 via the transport module 104. For example, the Ethernet deframers/framers 408a-c can frame uplink signals, including user device identification and PRACH preamble power levels, for transport to the transport module 104. In turn, the transport module 104 can frame all of the signals received from the remote units 904a-c and provide the signals to the fronthaul physical layer coordinator 204. Accordingly, the transport module 104 provides the power levels of the PRACH preamble signal as measured by each remote unit 904a-c.

In block 1010, the remote unit that received the PRACH preamble with the highest power level can be selected to serve the user device. For example, the fronthaul physical layer coordinator 204 can execute an algorithm to compare the power levels of the PRACH preamble measured by each remote unit 904a-c and select the remote unit that detected the strongest power level. Thus, the remote unit chosen to serve the user device can be the remote unit with the lowest path loss.

The fronthaul physical layer coordinator 204 can further relay the detected user device identifier to the MAC layer as part of an uplink RACH transport channel. The MAC scheduler 306, shown in FIG. 11, can assign the user device a C-RNTI, thus attaching the user device to the cell. Once the user device is attached to the cell, the MAC scheduler 306 can allocate time/frequency resources to the user device by allocating a PRB to the user device. Thus, the fronthaul physical layer coordinator 204 can schedule spatial resources by scheduling the user device with a particular remote unit based on the measured PRACH preamble power levels, and the MAC scheduler 306 can schedule time/frequency resources to the given user device. FIG. 13 is a table depicting the scheduling of the user devices 902a-b shown in FIG. 9. The MAC scheduler 306 unit can schedule time/frequency resources to the user devices by allocating PRBs to the remote units The fronthaul physical layer coordinator 204 (referred to in FIG. 13 as "FPC") selects the remote unit that should receive serve each user device.

The fronthaul physical layer coordinator 204 can also store the PRACH preamble power level information and identification of the remote unit in order to properly route the time/frequency resources allocated by the MAC scheduler 306 to user device. In another aspect, if the fronthaul physical layer coordinator 204 detects that the difference between measured power levels of the preamble is within a pre-defined delta, then the fronthaul physical layer coordinator 204 may decide to serve the user device with both remote units.

In another aspect, a single remote unit can be selected to provide coverage for all user devices in a given coverage area. If the downlink physical layer processing is performed entirely by the fronthaul physical layer coordinator 204, and if all mobile devices in a coverage area are to be scheduled in a single remote unit, then a specific downlink frame can be generated and IQ samples containing all control information and user data transmitted to that remote unit. If downlink physical layer processing is performed partially at the fronthaul physical layer coordinator 204 and partially performed at the remote unit, then for all mobile devices in a coverage area to be scheduled in a given remote unit, then only the downlink user device payload can be transmitted to that remote unit.

In another aspect, the fronthaul physical layer coordinator 204 can select the optimal remote unit(s) to serve a user device based on uplink PRB power measurements performed for each user device by each remote unit. The process of measuring and comparing the PRB power levels and selecting optimal remote units based on the comparison of PRB power levels is similar to the remote unit selection based on the PRACH preamble power detection process described in reference to FIG. 10.

As user devices change location by moving across a coverage area, remote units can continue to measure the power levels of uplink PRBs transmitted by the user devices. By providing the new updated PRB power levels to the fronthaul physical layer coordinator 204, the fronthaul physical layer coordinator 204 can dynamically re-select the optimum remote unit(s) to serve the user device(s) and thereby re-allocate the spatial resources.

Thus, in one aspect, one or more remote units can receive a PRACH preamble. The one or more remote units can identify a given user device based on the received PRACH preamble. The one or more remote units can also measure the power level of the received PRACH preamble. The one or more remote units can transmit the user device identification and the associated power level of the PRACH preamble to a fronthaul physical layer coordinator. The fronthaul physical layer coordinator can select the remote unit that received the PRACH preamble with the highest power level.

Selecting the Proper Transmission Mode

In another aspect, user devices can be scheduled within the cells across one or more remote units using shared or different PRB levels via different transmission modes. The spatial division multiple access of user devices by selecting different transmission modes can be performed in both the downlink and the uplink directions.

Various transmission modes exist. For example, in an MU-MIMO transmission mode, two user devices can be scheduled within a cell on the same PRB level across two or more antennas (or two remote units). In an SU-MIMO transmission mode, a single user device can be scheduled within a cell within the same PRB level across two or more antennas or two remote units. In a SIMO transmission, the PRB levels are not shared, and each user device can be scheduled within a cell on different PRB levels such that each remote unit transceives only the PRB levels associated with the corresponding user device. In a joint processing transmission, a single user device can be scheduled within a cell using intra-cell CoMP techniques across two or more antennas or remote units. Other transmission modes are also possible.

The best user device candidates for MU-MIMO can be selected based on measured downlink and uplink PRB power levels at the remote unit, which may be referred to as spatial pairing/grouping of multiple user devices to be served on the same time and frequency resources. User devices with large power changes (e.g., indicating good isolation) can be paired for multi-user MIMO transmission on the same PRBs.

Figure 15:
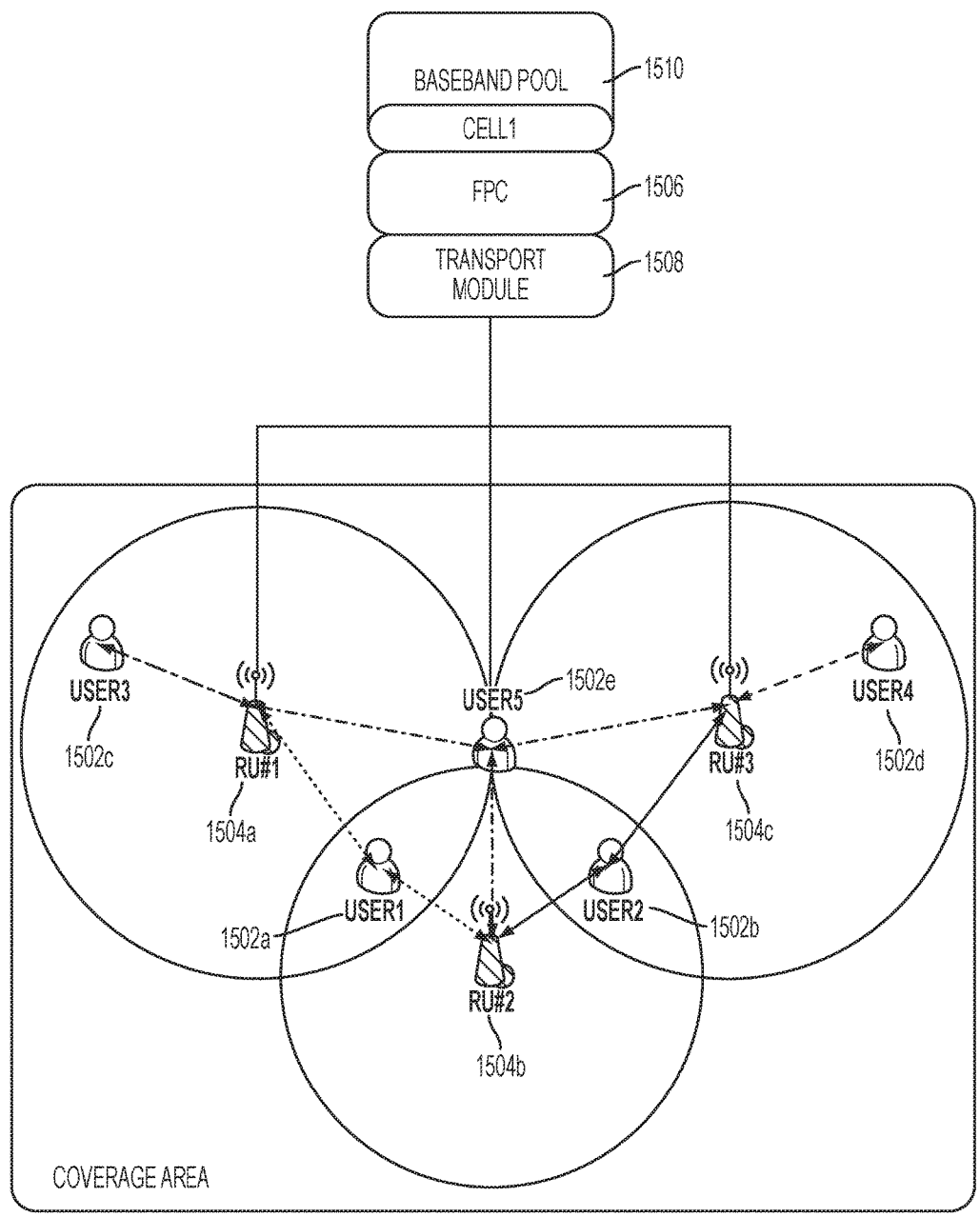
FIG. 15 is a schematic diagram depicting an example of a single cell simulcast across remote units according to one aspect.

For example, FIG. 15 is a schematic diagram showing an example of a single cell simulcast across three remote units 1504a-c serving five user devices 1502a-e (labeled in FIG. 15 as Users 1-5). Communicating with the remote units 1504a-c through a fronthaul physical layer coordinator 1506 (labeled "FPC" in FIG. 15) and a transport module 1508 is a baseband pool 1510 for a single cell. Each remote unit 1504a-c can measure uplink PRB power levels from neighboring user devices 1502a-e, and the fronthaul physical layer coordinator 1506 can determine the optimal transmission and reception mode by comparing the absolute and relative PRB power levels.

Figure 16:
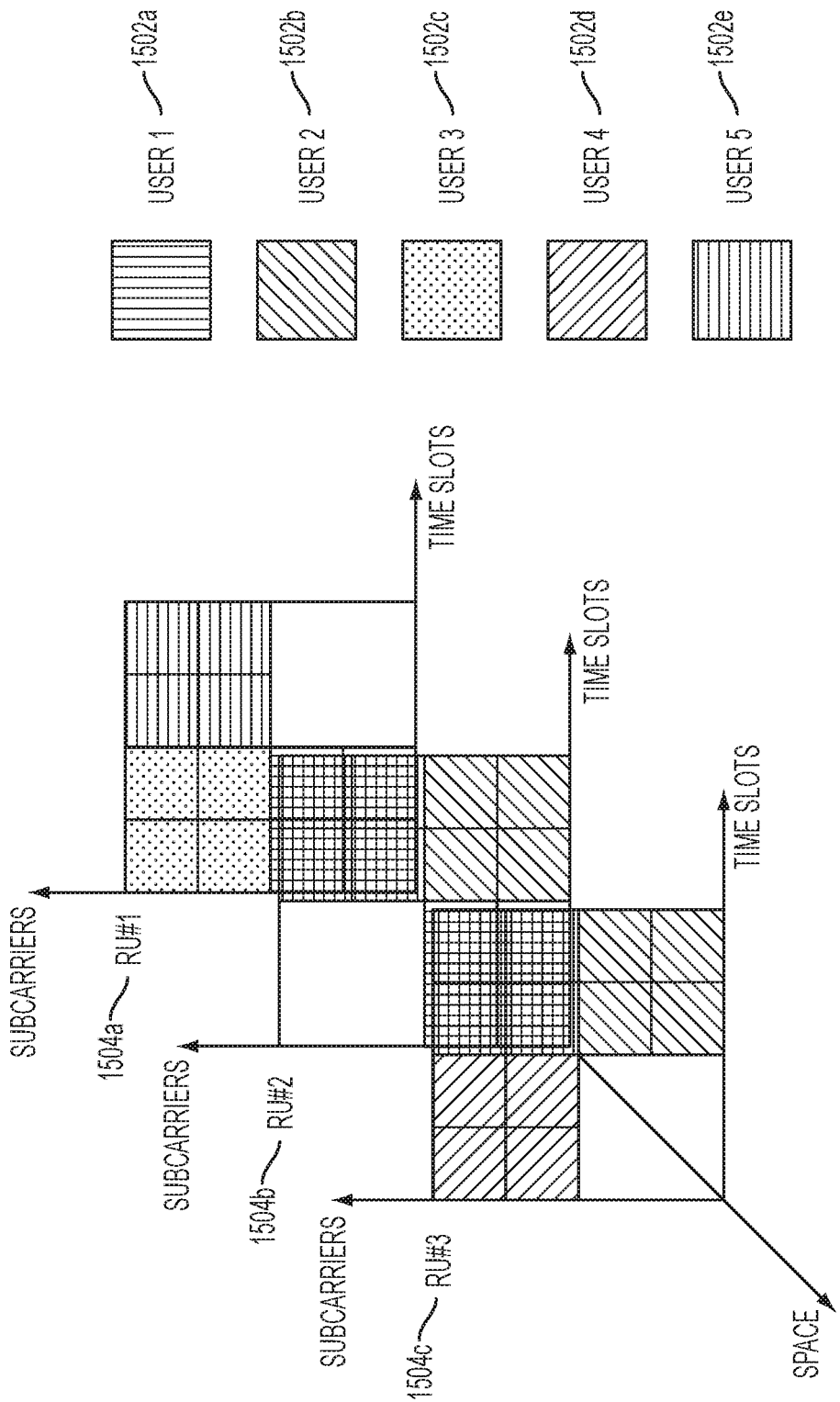
FIG. 16 is a diagram depicting time/frequency and spatial allocation for user devices scheduled with different transmission modes according to one aspect.

FIG. 16 is a diagram showing an example of how time/frequency resources and spatial resources can be allocated to the user devices 1502a-e and distributed across remote units 1504a-c. FIG. 16 shows the time/frequency resource distribution across each remote unit 1504a-c (labeled as RU#1-RU#3). FIG. 16 also shows the overlapping spaces between remote units 1504a, 1504b, and between 1504b, 1504c.

Remote unit 1504a can serve user devices 1502a, 1502c, and 1502e. Remote unit 1504b can serve user devices 1502a, 1502b, and 1502e. Remote unit 1504c can serve user devices 1502b, 1502d, and 1502e. Depending on the PRB power levels measured at the remote units 1504a-c, various transmission mode configurations are possible. Remote units 1504a-c can serve the relevant user devices 1502a-e by transmitting and receiving signals in different transmission modes for each user device 1502a-e.

In the example shown in FIG. 16, user device 1502a can be scheduled with remote units 1504a and 1504b via an SU-MIMO transmission mode. Similarly, user device 1502b can be scheduled with remote units 1504b and 1504c via an SU-MIMO transmission mode. User devices 1502c and 1502e can be assigned remote unit 1504a via an MU-MIMO transmission mode (assuming remote unit 1504a includes multiple antennas). Similarly, user devices 1502d and 1502e can be assigned remote unit 1504c via an MU-MIMO transmission mode (assuming remote unit 1504c has two antennas). User device 1502e can also be scheduled with remote units 1504a-c via a joint transmission mode.

For multi-user and multi-antenna transmission modes (such as MIMO transmission modes), the physical layer processing functions are similar to the processing functions for single antenna transmissions (such as SIMO transmissions) as described previously with respect to FIGS. 5-7. For example, FIG. 14 depicts a block diagram showing an example of physical layer 1 processing functions for a MIMO transmission.

Figure 14:
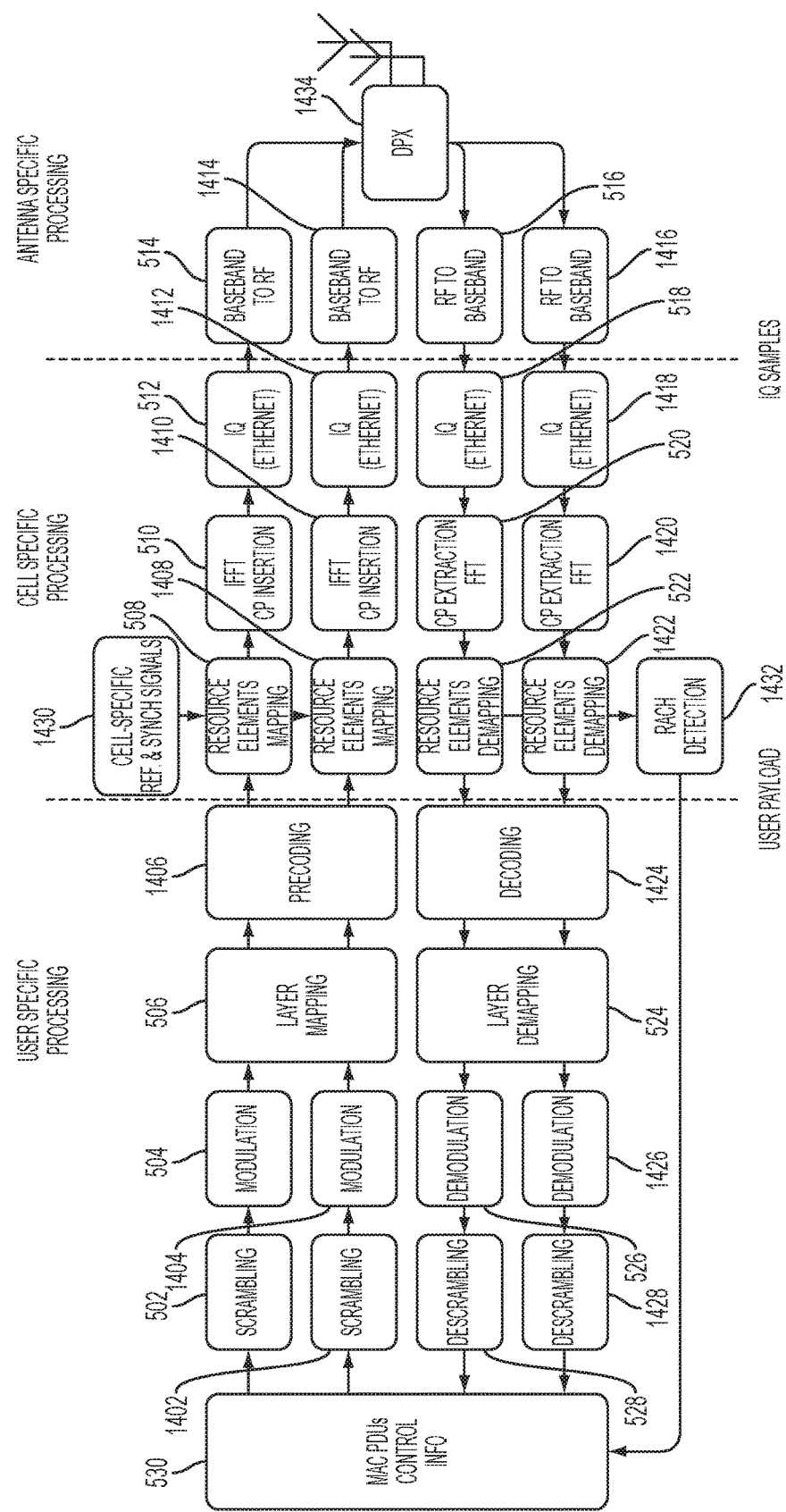
FIG. 14 is a block diagram showing an example of physical layer processing functions for a MIMO transmission mode according to one aspect.

The data payload provided by the MAC layer to be processed and transmitted by the physical layer is depicted in FIG. 14 as the MAC PDU Control information block 530. Similar to a SIMO transmission, in the downlink direction, the user-specific processing on a PDU can include scrambling 502, modulation 504, and layer to antenna mapping 506. The cell-specific processing functions in the downlink direction can include resource elements mapping 508, IFFT and cyclic prefix insertion 510, and in-phase/quadrature ("I/Q") processing 512. In the downlink direction there is also basic RF front-end functions, such as baseband to RF processing 514. The physical layer functions 502, 504, 506, 508, 510, 512, and 514 all operate on a downlink PDU. In a MIMO transmission, a second downlink PDU can be processed in parallel via similar physical layer functions including scrambling 1402, modulation 1404, precoding 1406, resource element mapping 1408, IFFT and cyclic prefix insertion 1410, I/Q processing 1412, and baseband to RF processing 1414.

Similarly, in uplink direction, parallel physical layer processing can be performed on two PDU via RF to baseband processing 516, 1416, I/Q processing 518, 1418, cyclic prefix extraction and FFT 520, 1420, resource element mapping 522, 1422, layer demapping 524, demodulation 526, 1426, and descrambling 528, 1428.

In addition, physical layer processing for MIMO transmissions can include additional functionality in the downlink direction such as precoding 1406, which performs additional processing on the downlink PDUs, and the insertion of cell-specific reference and synchronization signals 1430. In the uplink direction, additional MIMO functionality can include RACH detection 1432 and decoding 1424. Additional data path loop extension functionality 1434 (labeled as "DPX") can be performed at the remote units.

In determining the optimal transmission and reception mode to serve a specific user device, as discussed above, the MAC scheduler can be in charge of selecting a transmission mode. In other aspects, the physical layer scheduler in the fronthaul physical layer coordinator can select the antenna ports/remote units following optimization criteria based on a preferred transmission mode, and the physical layer scheduler can influence the MAC scheduler decision using specific control signaling.

For example, the fronthaul physical layer coordinator 1506 can take into account the path-loss affecting the RF propagation between the user device and the multiple remote units. The path-loss between the user device and the remote units can be determined by the power level of uplink PRBs provided from the user device to the remote units. Specifically, the fronthaul physical layer coordinator 1506 can measure the absolute power levels of the uplink PRBs and compare relative power levels received by different remote units.

Two types of power thresholds may be used: an absolute power threshold and a relative power threshold. The relative power threshold may be a change in power between the user device and two or more remote units.

If the measured uplink PRB power for a specific user device and a remote unit is lower than the absolute threshold, CoMP schemes may not be used. Only the remote unit with the higher measured uplink PRB power can be selected to serve the user device. The remote units belonging to the same cell but not selected for serving the user device can stop transceiving on the PRBs allocated to that specific user device (i.e., PRB coordinated silencing). If the measured uplink PRB power for a specific user device and remote unit is higher than the absolute threshold, CoMP schemes (both intra-cell and inter-cell) may be considered. Only the links between the user device and remote units with measured uplink PRB power levels within a specific change range can be selected for jointly serving the user device. The fronthaul physical layer coordinator 1506 can jointly process soft symbol bins from the selected multiple remote unit uplink fast Fourier transforms.

Figure 12:
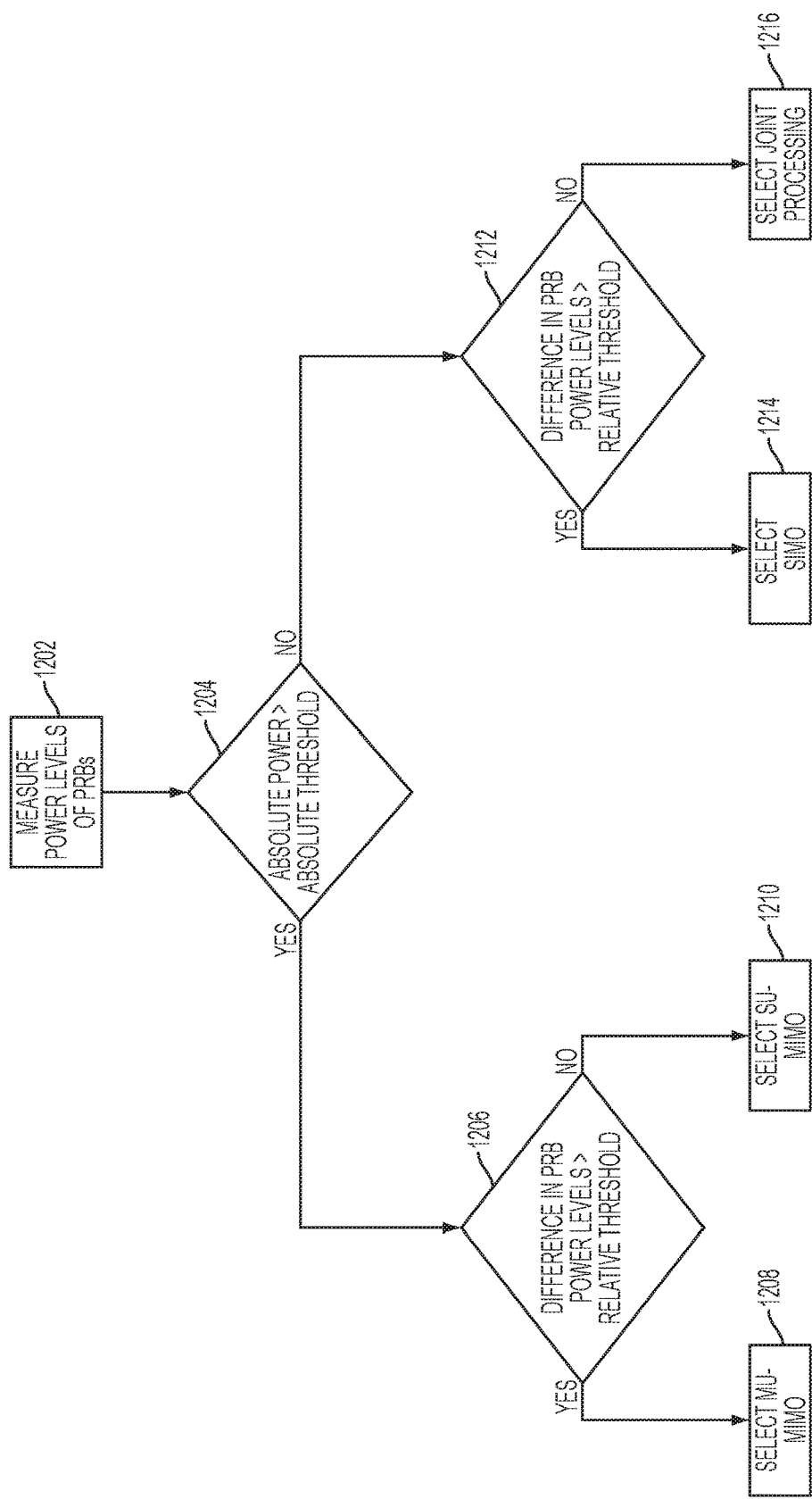
FIG. 12 is a flowchart of an example of a process for selecting an optimal transmission mode according to one aspect.

FIG. 12 is a flowchart depicting an example process to components of a C-RAN can implement to select the optimal transmission mode. In block 1202, each remote unit can measure the power level of a signal received from the user device. In one aspect, remote units can measure the absolute power level of an uplink PRB and provide the measured power level to the fronthaul physical layer coordinator 1506 via the transport module 104 as described above. For example, the remote units can measure the power level of the uplink PRB via a dedicated power meter. Because the user device can be located in overlapping coverage areas for multiple remote units, each remote unit can measure a different power level of the uplink PRB signal provided by the user device.

In block 1204, the fronthaul physical layer coordinator 1506 can evaluate the measured power levels provided from the remote units and determine if the power levels are greater than a pre-determined absolute threshold. For example, the physical layer scheduler component can compare the measured power levels to the pre-determined absolute threshold. Alternatively, a processor in the physical layer coordinator 1506 can be used to compare the measured power levels to the absolute threshold.

If the measured power levels of at least two of the received uplink PRBs are greater than the pre-determined threshold, then the physical layer coordinator 1506 can proceed to compare the difference in power levels of the uplink PRBs as measured by two remote units. In block 1206, the physical layer coordinator 1506 can determine if the difference in power levels between the uplink PRBs as measured by the two remote units is greater than a pre-determined relative threshold. For example, the physical layer scheduler component or a separate processor can calculate the difference in power levels between the uplink PRBs and determine if the difference in power level is greater than the relative threshold.

In block 1208, if the difference in power levels between the uplink PRBs as measured by the two remote units is greater than a relative threshold, then the physical layer coordinator 1506 can select an MU-MIMO transmission mode. For example, the physical layer scheduler component can set the remote units to transmit signals using an MU-MIMO mode. By selecting an MU-MIMO transmission mode, a second user device can be scheduled across the two remote units. In block 1210, if the difference in power levels between the uplink PRBs as measured by the remote units is less than a relative threshold, then the physical layer coordinator 1506 can select an SU-MIMO transmission mode for the remote units that detected the uplink PRBs. For example, the physical layer scheduler component can set the remote units to transmit signals to the user device using SU-MIMO.

In block 1212, if the measured power level of an uplink PRB is not greater than an absolute threshold, then the physical layer coordinator 1506 can proceed to calculate the difference in power levels of uplink PRBs from two remote units and compare the power levels to a relative threshold. In block 1214, if the difference in power levels between the uplink PRBs is greater than the relative threshold, then the physical layer coordinator 1506 can select a SIMO transmission mode. For example, the physical layer scheduler component can set the remote units to transmit using a SIMO transmission mode. In block 1216, if the difference in power levels between the uplink PRBs is less than a relative threshold, then the physical layer coordinator 1506 can select a joint processing transmission mode. By selecting a joint processing transmission mode, the user device can be scheduled to receive intra-cell CoMP transmissions from both remote units.

Thus, in one aspect, one or more remote units can receive uplink PRBs. The one or more remote units can determine an absolute power level by measuring the power level of the PRBs. The one or more remote units can provide the absolute power level to the fronthaul physical layer coordinator. The fronthaul physical layer coordinator can determine a relative power level by comparing the power level of the PRBs as measured by different remote units. The fronthaul physical layer coordinator can select a transmission mode based on the absolute power level and the relative power level.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A centralized radio access network (C-RAN), comprising:
a media access control (MAC) scheduler; and
a fronthaul physical layer coordinator positioned between the MAC scheduler and a plurality of remote units, the fronthaul physical layer coordinator including a fronthaul physical layer scheduler for determining at least one remote unit of the plurality of remote units to serve a mobile device, wherein the fronthaul physical layer coordinator is configured for formulating an allocation of physical layer processing between the plurality of remote units and a baseband processing unit based on resources selected by the fronthaul physical layer scheduler and the MAC scheduler for serving the mobile device.

2. The C-RAN of claim 1, wherein the MAC scheduler is configured for allocating time resources, frequency resources, modulation and coding scheme, and transmission mode for serving the mobile device.

3. The C-RAN of claim 1, wherein the fronthaul physical layer coordinator is configured for implementing a different allocation plan in the C-RAN based on a policy from a system administrator.

4. The C-RAN of claim 1, wherein the fronthaul physical layer coordinator is configured for formulating the allocation of physical layer processing between the plurality of remote units and the baseband processing unit based on a traffic condition detected in the C-RAN.

5. The C-RAN of claim 1, wherein the fronthaul physical layer coordinator is configured for implementing the allocation by outputting signals that configure the plurality of remote units and the baseband processing unit.

6. The C-RAN of claim 1, wherein the physical layer processing includes scrambling, descrambling, modulation, demodulation, layer to antenna mapping, layer to antenna demapping, resource elements mapping, resource elements demapping, inverse fast Fourier transport and cyclic prefix insertion, fast Fourier transport and cyclic prefix extraction, and baseband processing.

7. The C-RAN of claim 1, further comprising the plurality of remote units, at least one of the plurality of remote units being configured for implementing full physical layer processing, partial physical layer processing, and no physical layer processing in transceiving signals wirelessly with the mobile device located in a coverage area.

8. The C-RAN of claim 7, wherein the at least one of the plurality of remote units is a remote radio head that is automatically switchable between a small cell mode and a C-RAN mode.

9. The C-RAN of claim 7, wherein the C-RAN is configured for supporting an intra-cell Coordinate Multi-Point (CoMP) transmission mode and an inter-cell CoMP transmission mode, wherein the intra-cell CoMP transmission mode involves communication between multiple remote units of the plurality of remote units that relay the same sector of signals, wherein the inter-cell CoMP transmission mode involves communication between the multiple remote units of the plurality of remote units that relay different sectors of signals.

10. The C-RAN of claim 1, wherein the fronthaul physical layer coordinator is configured for conducting real time analysis of power received in an uplink physical resource block by the plurality of remote units providing coverage to a common cell identifier and using channel estimation indexes in obtaining a maximum gain when jointly processing fast Fourier transform bins of physical resource blocks from the plurality of remote units.

11. A wireless distribution system, comprising:
a baseband pool for transceiving signals with a backhaul network, the baseband pool including a media access control (MAC) scheduler;
remote units configured for providing wireless signal coverage for mobile devices in a coverage area; and
a fronthaul physical layer coordinator positioned in a fronthaul network between the baseband pool and the remote units, the fronthaul physical layer coordinator including a fronthaul physical layer scheduler for determining at least one remote unit of the plurality of remote units to serve a mobile device, the fronthaul physical layer coordinator being configured for forming an allocation plan for allocating physical layer processing between the plurality of remote units and a baseband processing unit based on resources selected by the fronthaul physical layer scheduler and the MAC scheduler for serving the mobile device.

12. The wireless distribution system of claim 11, wherein the wireless distribution system is a centralized radio access network (C-RAN).

13. The wireless distribution system of claim 11, wherein the physical layer processing includes scrambling, descrambling, modulation, demodulation, layer to antenna mapping, layer to antenna demapping, resource elements mapping, resource elements demapping, inverse fast Fourier transport and cyclic prefix insertion, fast Fourier transport and cyclic prefix extraction, and baseband processing.

14. The wireless distribution system of claim 11, wherein the fronthaul physical layer coordinator includes a fronthaul physical layer scheduler that is configured to determine which remote unit of a plurality of remote units is to serve a selected mobile device and output signals for configuring the wireless distribution system such that the remote unit determined to serve the selected mobile device serves the selected mobile device.

15. The wireless distribution system of claim 11, wherein the wireless distribution system is configured for supporting an intra-cell Coordinate Multi-Point (CoMP) transmission mode and an inter-cell CoMP transmission mode, wherein the intra-cell CoMP transmission mode involves communication between multiple remote units that relay the same sector of signals, wherein the inter-cell CoMP transmission mode involves communication between the multiple remote units that relay different sectors of signals.

16. The wireless distribution system of claim 11, wherein the MAC scheduler is configured for allocating time resources, frequency resources, modulation and coding scheme, and transmission mode for serving a mobile device.

17. The wireless distribution system of claim 11, wherein the fronthaul physical layer coordinator is configured for conducting real time analysis of power received in an uplink physical resource block by the remote units providing coverage to a common cell identifier and using channel estimation indexes in obtaining a maximum gain when jointly processing fast Fourier transform bins of physical resource blocks from the remote units.

18. A method, comprising:
- detecting a traffic condition of a centralized radio access network (C-RAN) by a fronthaul physical layer coordinator between a media access control (MAC) scheduler and a plurality of remote radio heads;
- formulating a physical layer processing allocation plan between the remote radio heads and a baseband processing unit by the fronthaul physical layer coordinator based on resources selected by the fronthaul physical layer coordinator and the MAC scheduler for serving a mobile device; and
- determining at least one remote radio head of the plurality of remote radio heads to serve the mobile device by the fronthaul physical layer coordinator.

19. The method of claim 18, wherein the physical layer processing includes scrambling, descrambling, modulation, demodulation, layer to antenna mapping, layer to antenna demapping, resource elements mapping, resource elements demapping, inverse fast Fourier transport and cyclic prefix insertion, fast Fourier transport and cyclic prefix extraction, and baseband processing, the method further comprising:
- subsequently re-allocating the physical layer processing dynamically among a baseband processing unit and the plurality of remote radio heads based on a changed traffic condition.

* * * * *